United States Patent US 11,312,063 B2
Mizunuma et al. (45) Date of Patent: Apr. 26, 2022

(54) DOUBLE-SIDED TRANSCRIPTION TYPE SHEET/FILM FORMING ROLL APPARATUS AND DOUBLE-SIDED TRANSCRIPTION TYPE SHEET/FILM FORMING METHOD

(71) Applicant: TOSHIBA KIKAI KABUSHIKI KAISHA, Tokyo (JP)

(72) Inventors: Koji Mizunuma, Sunto-Gun (JP); Ryota Oke, Mishima (JP); Tomonori Yamaguchi, Sunto-Gun (JP); Akihiro Iwata, Gotemba (JP)

(73) Assignee: SHIBAURA MACHINE CO., LTD., Tokyo (JP)

(*) Notice: Subject to any disclaimer, the term of this patent is extended or adjusted under 35 U.S.C. 154(b) by 533 days.

(21) Appl. No.: 16/039,928

(22) Filed: Jul. 19, 2018

(65) Prior Publication Data

US 2019/0022920 A1 Jan. 24, 2019

(30) Foreign Application Priority Data

Jul. 20, 2017 (JP) .............................. JP2017-141032

(51) Int. Cl.
 *B30B 3/00* (2006.01)
 *B29C 59/04* (2006.01)
 (Continued)

(52) U.S. Cl.
 CPC .............. *B29C 59/04* (2013.01); *B29C 43/24* (2013.01); *B29C 43/245* (2013.01); *B29C 43/46* (2013.01);
 (Continued)

(58) Field of Classification Search
 CPC .. B30B 3/00; B30B 3/04; B30B 3/005; B30B 3/045; B30B 15/166; B30B 15/0029;
 (Continued)

(56) References Cited

U.S. PATENT DOCUMENTS 5,320,787 A * 6/1994 Hayashi ................ B29C 43/222
264/1.33
6,074,192 A * 6/2000 Mikkelsen ............ B29C 43/222
425/327

(Continued)

FOREIGN PATENT DOCUMENTS

CN 1867444 11/2006
CN 1919580 2/2007
(Continued)

OTHER PUBLICATIONS

Japanese Office Action issued in JP 2017-141032 dated Dec. 19, 2017.
(Continued)

*Primary Examiner* — Jimmy T Nguyen
(74) *Attorney, Agent, or Firm* — DLA Piper LLP US

(57) ABSTRACT

An apparatus includes a first roll and a second roll on each of which a pattern is formed, a first motor and a second motor to rotate the respective rolls, a shaft direction supporting mechanism to support the second roll along a shaft direction and an axial position adjusting mechanism configured to move the shaft direction supporting mechanism along the shaft direction. The posture of the rotating shaft of the second motor is maintained constant at all times, and the second roll is moved in the shaft direction along the first roll, thereby adjusting the positions of both patterns on the first roll and the second roll along the shaft direction.

10 Claims, 18 Drawing Sheets

(51) Int. Cl.
  *B29C 59/00* (2006.01)
  *B29C 48/00* (2019.01)
  *B29C 48/08* (2019.01)
  *B29C 43/24* (2006.01)
  *B29C 43/46* (2006.01)
  *B29C 48/92* (2019.01)
  *B30B 15/16* (2006.01)
  *B30B 15/00* (2006.01)
  *B29C 43/58* (2006.01)

(52) U.S. Cl.
  CPC ...... *B29C 48/0011* (2019.02); *B29C 48/0018* (2019.02); *B29C 48/08* (2019.02); *B29C 48/92* (2019.02); *B29C 59/002* (2013.01); *B29C 2043/5825* (2013.01); *B29C 2043/5833* (2013.01); *B29C 2948/92647* (2019.02); *B29C 2948/92942* (2019.02); *B30B 3/005* (2013.01); *B30B 15/0029* (2013.01); *B30B 15/166* (2013.01)

(58) Field of Classification Search
  CPC ....... B29C 43/46; B29C 43/24; B29C 43/245; B29C 48/08; B29C 48/0011; B29C 48/0018; B29C 48/92; B29C 59/002; B29C 59/04; B29C 2043/5833; B29C 2043/5825; B29C 2948/92647; B29C 2948/92942
  See application file for complete search history.

(56) References Cited

U.S. PATENT DOCUMENTS

| | | | |
|---|---|---|---|
| 6,250,904 B1 | 6/2001 | Reddy et al. | |
| 7,182,813 B2 | 2/2007 | Endo et al. | |
| 7,241,126 B2* | 7/2007 | Saito | B29C 43/46 425/194 |
| 7,484,950 B2* | 2/2009 | Mizunuma | B29C 43/222 425/140 |
| 2005/0051931 A1 | 3/2005 | Humlicek et al. | |
| 2006/0223641 A1* | 10/2006 | Sekine | B62D 1/20 464/89 |
| 2009/0267246 A1* | 10/2009 | Conley | B29C 48/914 264/1.34 |
| 2015/0014880 A1 | 1/2015 | Flecke et al. | |
| 2016/0181888 A1* | 6/2016 | Kodani | H02K 1/22 310/68 B |
| 2017/0282418 A1 | 10/2017 | Mizumuma et al. | |

FOREIGN PATENT DOCUMENTS

| | | |
|---|---|---|
| CN | 1928648 | 3/2007 |
| JP | 62-35815 | 3/1987 |
| JP | H02-2530 | 1/1990 |
| JP | 08-025458 | 1/1996 |
| JP | H10-249909 | 9/1998 |
| JP | 2002-125355 | 4/2002 |
| JP | 2002-537154 | 11/2002 |
| JP | 2004-345239 | 12/2004 |
| JP | 2005-001170 | 1/2005 |
| JP | 2006-297786 | 11/2006 |
| JP | 2007-504973 | 3/2007 |
| JP | 2014-532001 | 12/2014 |
| JP | 6174775 | 8/2017 |
| JP | 2018-043512 | 3/2018 |
| KR | 10-2006-0110808 | 10/2006 |
| WO | WO 98/46406 | 10/1998 |

OTHER PUBLICATIONS

Japanese Office Action issued in JP 2016-071980 dated Jul. 12, 2016.
Japanese Office Action issued in JP 2016-176894 dated Oct. 11, 2016.
Japanese Office Action issued in JP 2016-239573 dated Mar. 7, 2017.
Taiwanese Office Action issued in TW 106109778 dated May 11, 2018.
English Language Abstract of JP 08-025458 dated Janaury 30, 1996.
English Language Abstract of JP 62-35815 issued Mar. 3, 1987
Tsubaki Echt-Flex Coupling (http:ptp.tsubakimoto.co.jp/contents/e_book/catarog/kik/C_CP_EF_E/pageview/data/target.pdf?_ga=2.198941743.1633275909.1525832979-461903027.1525832979).
Abssac Shaft Coupling Schmidt Semiflex (https://www.abssac.co.uk/uploads/docs/sre3agqz_Abssac_Schmidt_Semiflex.pdf).
History of U.S. Appl. No. 15/474,413, filed Mar. 30, 2017.
Korean Office Action in KR Appplication No. 10-2018-0082818 dated Nov. 7, 2019.
Chinese Office Action in CN Appplication No. 201810797592.2 dated Apr. 9, 2020.

* cited by examiner

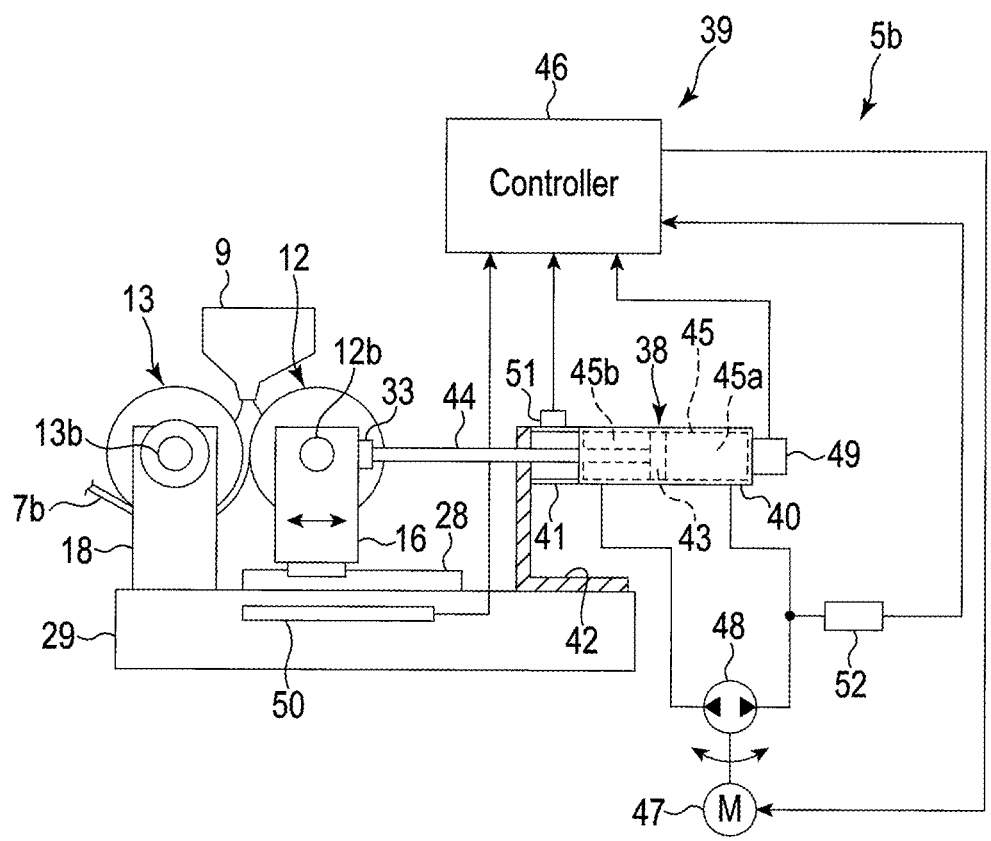
F I G. 10
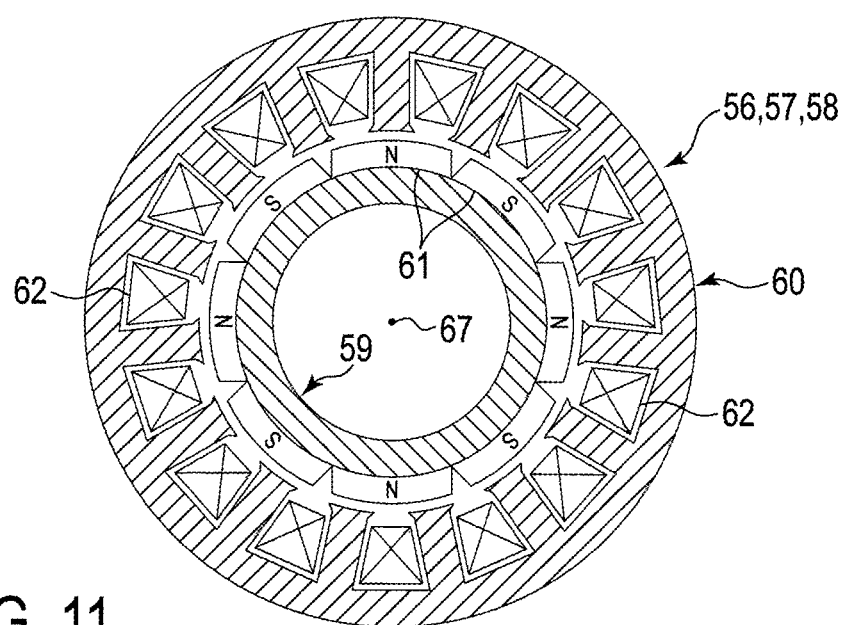
F I G. 11

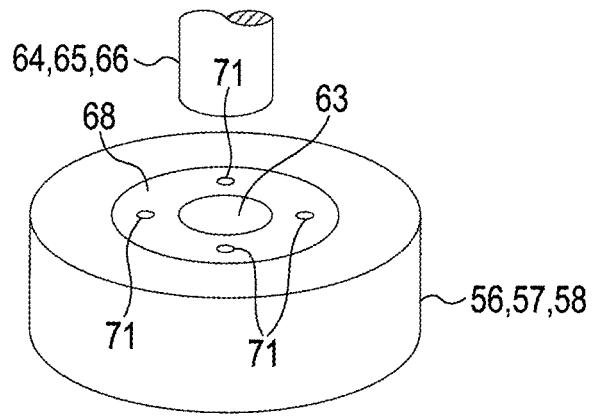
F I G. 12
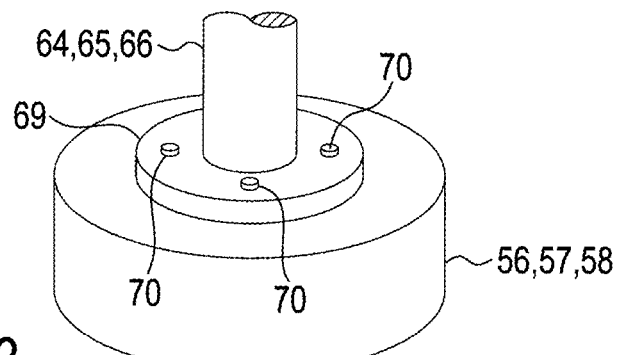
F I G. 13
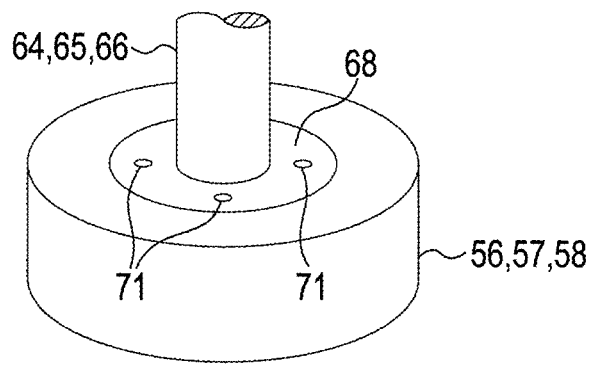
F I G. 14

(Conventional sample)

(Sample of present invention)

DOUBLE-SIDED TRANSCRIPTION TYPE SHEET/FILM FORMING ROLL APPARATUS AND DOUBLE-SIDED TRANSCRIPTION TYPE SHEET/FILM FORMING METHOD

CROSS-REFERENCE TO RELATED APPLICATIONS

This application is based upon and claims the benefit of priority from prior Japanese Patent Application No. 2017-141032, filed Jul. 20, 2017, the entire contents of which are incorporated herein by reference.

BACKGROUND OF THE INVENTION

1. Field of the Invention

The present invention relates to a sheet/film manufacturing (forming) technique for manufacturing (forming) a sheet or a film, on both surfaces of which patterns are transcribed, without causing a gear mark (i.e., horizontal stripes).

2. Description of the Related Art

In a sheet/film manufacturing (forming) technique, for example, a molten resin is discharged from a T-die in a thin and spread form. The discharged molten resin is fed into a part between two rolls rotating in opposition to each other. The gap between the rolls is controlled. Thus, a sheet or a film appropriate for the intended purpose or use is continuously manufactured (formed). Here, Patent Literatures 1 (JP H10-249909 A), 2 (JP H08-25458 A), 3 (JP S62-35815 U), and 4 (JP 2005-1170 A) in which apparatuses associated with sheet/film manufacturing (forming) techniques are disclosed are known.

In the apparatus of Patent Literature 1, each of a reference roll, and driven rolls arranged on both sides of the reference roll is drive-controlled by a precision control motor through a shaft coupling and a reducer. Each of the rolls is stably rotated. Thus, the optical characteristics of the sheet can be improved. In other words, retardation of the sheet becomes small.

In the apparatus of Patent Literature 2, a sheet-like substance is pressed between a first roll and a second roll rotating in opposition to each other and, is thereafter cooled by a third roll. The surface temperatures of the first to third rolls, and the speed of receiving the sheet from the third roll are controlled to within the ranges set in advance. Thus, a polycarbonate sheet in a fine surface condition, without a bend or a curve, and excellent in flatness can be obtained.

In the apparatus of Patent Literature 3, a planetary roller reducer requiring no ears is employed in place of a gear reducer. A plastic sheet is manufactured (formed) without causing a backlash peculiar to a gear mechanism. Thus, a plurality of gear marks (horizontal stripes) are prevented from occurring on the sheet surface in a direction intersecting the feed direction of the sheet.

In the apparatus of Patent Literature 4, a so-called direct-drive drive mechanism is employed as a roll drive system. In such as drive mechanism, the motor (rotor) is directly coupled to the roll (drive shaft part) (i.e., direct coupling) in a state where all the types of reducers including the gear reducer and the planetary roller reducer are excluded. Thus, in a state where the rotation central axis of the roll (drive shaft part) is maintained in a fixed posture, in other words, in a state where the rotation central axis of the motor (rotor) is maintained in a fixed posture, a sheet or a film is manufactured (formed) without causing gear marks (horizontal stripes).

However, in the apparatuses of Patent Literatures 1 and 2, the forming conditions and the operation conditions are limited. That is, the intended purpose or use is limited. For this reason, the apparatuses are deficient in diversity. The apparatus of Patent Literature 3 needs to secure a large installation location for the planetary roller reducer. That is, the planetary roller reducer has a complicated structure. Accordingly, the whole apparatus has to be inevitably made larger. For this reason, reduction in the size of the whole apparatus has a certain limit.

Furthermore, regarding the apparatus of Patent Literature 4, the inventers of the present invention have found the fact that there is the following problem in the process of earnestly carrying out research and development. The apparatus of Patent Literature 4 is specified in such a manner that a roll directly coupled to the motor is rotated.

Incidentally, while the motor is operating, torque ripples occur in the motor. Torque ripples imply a ripple phenomenon caused by the mutual interaction of magnetic flux components between the stator and the rotor when a current is made to flow through the motor to thereby cause relative rotation between the stator and the rotor.

In this case, when an amplitude of a certain frequency component (wavelength component) among frequency components (wavelength components) constituting the torque ripples (pulsation phenomenon) exceeds, for example, a threshold, gear marks (horizontal stripes) of an amplitude corresponding to the amplitude of the frequency component (wavelength component) occur in some cases.

In the specification of the Patent Literature 4, a molten resin discharged from a T-die is fed into a part between two rolls rotating in opposition to each other. At this time, for example, operation conditions or forming conditions such as adjustment of the gap between the rolls, rotation-control of the motor or the like are set. Thus, a sheet or a film is continuously manufactured (formed) without causing gear marks (horizontal stripes).

During such a manufacturing (forming) process, in order to carry out, for example, thickness adjustment of the formed product or disturbance correction, the state (for example, posture, and angle) where one roll is pressed against the other roll is changed. At this time, the influence of the pressed state of the one roll on the other roll, i.e., the changed state of the other roll is directly transmitted to the motor. In other words, the bent states of both the rolls are changed, and the changed bent states are directly transmitted to the motor. Thereby, the posture of the rotation central axis of the motor concerned is changed. When the posture of the rotation central axis of the motor is changed, the amplitude of the torque ripples (pulsation phenomenon) described above is changed correspondingly.

The change in amplitude of the torque ripples (pulsation phenomenon) corresponds to a change in amplitude of each of the various frequency components (wavelength components) occurring in the rotating motor. Here, when an amplitude of a certain frequency component (wavelength component) exceeds, for example, the threshold, in other words, depending on the degree of the magnitude of the pressed state of the one roll, gear marks (horizontal stripes) corresponding to the amplitude (amplitude of the frequency component (wavelength component)) occur in some cases.

At this time, not only gear marks (horizontal stripes) based on a single frequency component (wavelength component), but also gear marks (horizontal stripes) based on a result of duplication of a plurality of frequency components (wavelength components) occur in some cases. Thus, on the surface of the sheet (film), a plurality of gear marks (horizontal stripes) occur in a direction intersecting the feed direction of the sheet (film).

In FIG. 21, image data obtained by shooting a plurality of gear marks (horizontal stripes) is shown. In the image data, a plurality of gear marks (horizontal stripes) have occurred on the surface of the sheet (film) in the direction intersecting the feed direction of the sheet (film). In FIG. 21, a plurality of gear marks (horizontal stripes) having predetermined regularity or periodicity are shown as an example. The occurrence timing (period, interval (pitch)) of the plurality of gear marks (horizontal stripes) is about 30 mm or less.

Such gear marks (horizontal stripes) constitute a primary factor of deteriorating the external appearance and optical characteristics of the sheet (film). For this reason, a technique capable of maintaining the posture of the rotation central axis of the motor constant even when the state where the one roll is pressed against the other roll is changed, in other words, a technique by which the influence of the pressed state of the one roll on the other roll, i.e., a changed state of the other roll is prevented from being transmitted to motor is required.

In addition, the gear mark (horizontal stripes) may create a problem also when manufacturing (forming) the sheet (film) on both surfaces of which patterns are transcribed. For example, when the thickness of the sheet (film) changes subtly with a gear mark (horizontal stripe), it may become impossible to maintain the transcription depth of the patterns at constant or degrade optical homogeneity depending on the amount changed.

Further, in the specification of transcribing patterns to both surfaces of a sheet (film), for example, two rolls with the patterns formed on their transcription surfaces, are employed, which are, namely, a roll which transcribes patterns on a front surface of a sheet (film) and a roll which transcribes patterns on a rear surface of the sheet (film).

Incidentally, in some cases, the rolls may be shifted with relative to each other along the shaft direction while the apparatus are being driven. In this case, the shift appears as a displacement between the patterns on these surfaces of the sheet (film). Here, depending on the amount of displacement of the patterns, it may not be possible to manufacture (form) sheets (films) of a predetermined quality. Under these circumstances, there is a demand for such a technology of adjusting the positions of two rolls (patterns) along the shaft direction with respect to each other before starting the transcription of patterns or during transcribing to prevent the occurrence of such problems.

An object of the invention is to provide a technique of manufacturing (forming) a sheet (film) of a predetermined quality by preventing displacement of the patterns on both surfaces of a sheet (film) while avoiding the generation of a gear mark (horizontal stripe) beforehand.

BRIEF SUMMARY OF THE INVENTION

According to an embodiment, the apparatus comprises a first roll and a second roll, on which patterns are formed, a first motor and a second motor to rotate the respective rolls and a second power transmission mechanism (an intermediate shaft member, two shaft couplings), and further comprises an shaft direction supporting mechanism which supports the second roll along the shaft direction so as to be rotatable, and a shaft-direction position adjusting mechanism which moves the shaft-direction position adjusting mechanism along the shaft direction. Thus, while the posture of the rotating shaft of the second motor is maintained constant at all times, and by moving the second roll in the shaft direction along the first roll, the positions of the patterns of both the first roll and the second roll along the shaft direction are adjusted.

With the present invention, it becomes possible to realize a technique of manufacturing (forming) a sheet (film) by inhibiting the occurrence of gear marks (horizontal stripes) beforehand while preventing displacement between patterns on both surface of the sheet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a block diagram showing the configuration of a hydraulic servo type push-pull mechanism.

FIG. 11 is a cross-sectional view showing the internal configuration of a motor using permanent magnets.

FIG. 12 is a perspective view showing the configuration of a rotating shaft part which can be fitted into a motor.

FIG. 13 is a perspective view showing the configuration of a rotating shaft part which can be attached to the motor.

FIG. 14 is a perspective view showing the configuration of a rotating shaft part formed integral with the motor.

DETAILED DESCRIPTION OF THE INVENTION

[Situation Up to Present Invention]

Figure 1:
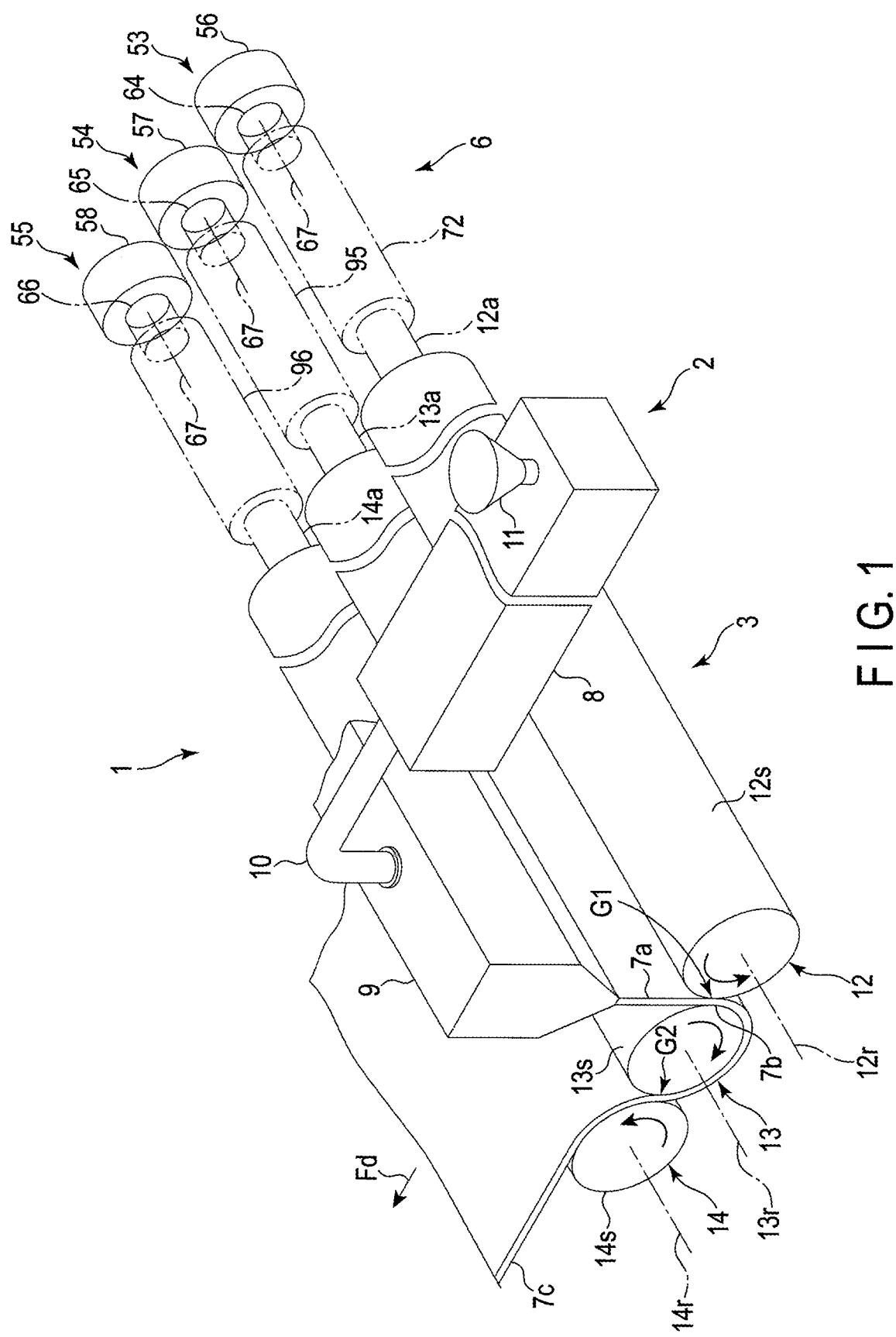
FIG. 1 is a perspective view schematically showing the basic configuration of a sheet/film manufacturing apparatus according to a first embodiment.

As a result of research and development earnestly carried out by the inventors of the present invention with respect to the sheet/film manufacturing (forming) technique in which the motor (rotor) and the roll (drive shaft part) are coupled to each other in a state where all the reducers are excluded, the present invention has been developed as shown in the following items (1) to (6).

(1) In the technical research concerned, a roll structure in which a roll is directly coupled to a motor is employed. That is, a first motor is directly coupled to a first roll. A second motor is directly coupled to a second roll. The first roll and the second roll are rotated in opposition to each other. Operation conditions and forming conditions are set in such a manner that no gear marks (horizontal stripes) occur. In such a state, a molten resin is fed into a part between the first roll and the second roll.

(2) During the manufacture (formation) of a sheet (film), in order to carry out, for example, thickness adjustment of the formed product or disturbance correction, the state (for example, posture, and angle) where the first roll is pressed against the second roll is changed. Then, a plurality of stripes similar to gear marks have occurred. The occurrence timing (period, interval (pitch)) of such stripes (i.e., gear marks (horizontal stripes)) is approximately coincident with the occurrence timing (period, interval (pitch)) of the torque ripples of the second motor. In this case, the influence of the torque ripples of the first motor on the occurrence of the stripes (gear marks (horizontal stripes)) is comparatively small.

(3) The occurrence timing (period, interval (pitch)) of the stripes (gear marks (horizontal stripes)) is strongly influenced by torque ripples caused by a cogging phenomenon. The cogging phenomenon implies a pulsation phenomenon caused by variation in the magnetic reluctance between the stator (coils) and the rotor (permanent magnets) when the stator (coils) and the rotor (permanent magnets) are relatively rotated without making a current flow through the motor.

(4) The state (for example, posture, and angle) where the first roll is pressed against the second roll is changed. At this time, the influence of the pressed state of the first roll on the second roll, i.e., the changed state (for example, the changed state of the posture of the rotation central axis of the second roll) of the second roll directly acts on the rotor of the second motor. In other words, the bent states of the first and second rolls change, and the changed bent states are directly transmitted to the second motor (rotor). Then, the posture of the rotation central axis of the rotor changes. Thereby, when the stator and the rotor are relatively rotated, a state where the gap between the stator and the rotor is not maintained constant in the circumferential direction, i.e., a state where the gap is irregularly changed in the circumferential direction is brought about. In such a state, the magnetic reluctance between the stator and the rotor irregularly changes in the circumferential direction. As a result, it becomes impossible to rotate the second motor smoothly at a constant speed.

In that case, amplitudes (i.e., magnitude of the torque ripples) of various frequency components (wavelength components) occurring in the second motor change. At this time, depending on the degree of the magnitude of the torque ripples of a certain frequency component (wavelength component), gear marks (horizontal stripes) corresponding to the amplitude of the frequency component (wavelength component) become liable to occur.

(5) When the coupled state of the second roll and the second motor becomes unstable depending on the degree of the state where the first roll is pressed against the second roll, it cannot necessarily be said that the structure in which the second roll and the second motor are directly coupled to each other is effective. Thus, a technique for maintaining the posture of the rotation central axis of the second motor constant, and making the influence of the pressed state of the first roll on the second roll, i.e., the changed state of the second roll not transmittable to the second motor is required.

(6) In order to realize such a technique, for example, a rotating shaft part, and a power transmission mechanism are prepared. The rotating shaft part is coupled to the second motor (rotor). The power transmission mechanism is arranged between the roll (drive shaft part) and the second motor (rotor). That is, the roll (drive shaft part) is coupled to one end side of the power transmission mechanism. The second motor (rotor) is coupled to the other end side of the power transmission mechanism.

According to this configuration, the influence of the state where the first roll is pressed against the second roll on the second roll, i.e., the changed state of the second roll is never transmitted to the second motor. In this case, the rotating shaft part coupled to the second motor is maintained in a constant posture at all times. The posture of the rotation central axis of the second motor (rotor) is also maintained constant at all times. Thereby, it is possible to smoothly rotate the second motor (rotor) at a constant speed at all times. As a result, it is possible to maintain the torque ripples of the second motor within a range (level) allowing no occurrence of gear marks (horizontal stripes).

[Sheet/Film Manufacturing Apparatus 1 According to First Embodiment]

Figure 2:
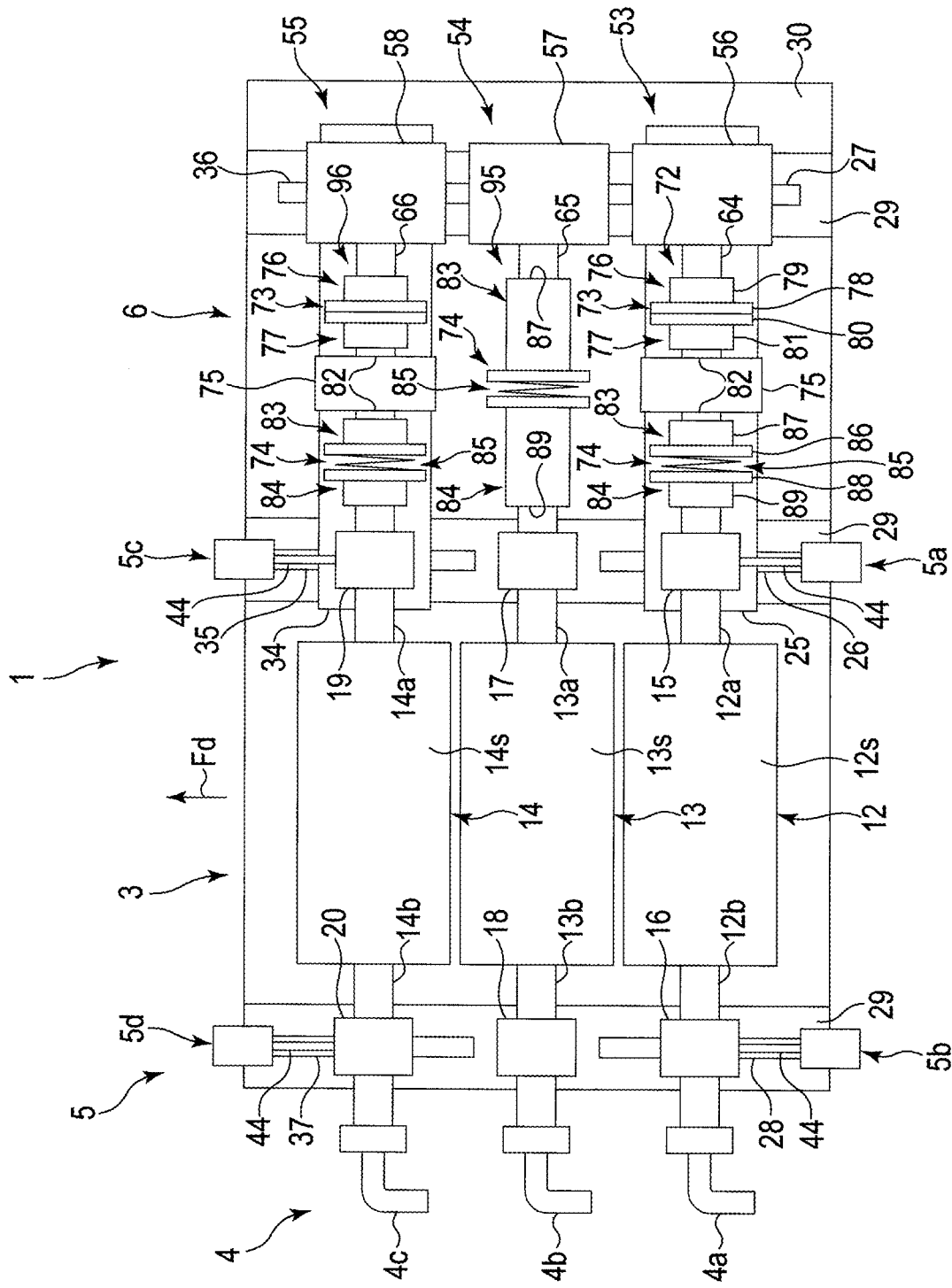
FIG. 2 is a plan view of the sheet/film manufacturing apparatus of FIG. 1.
Figure 3:
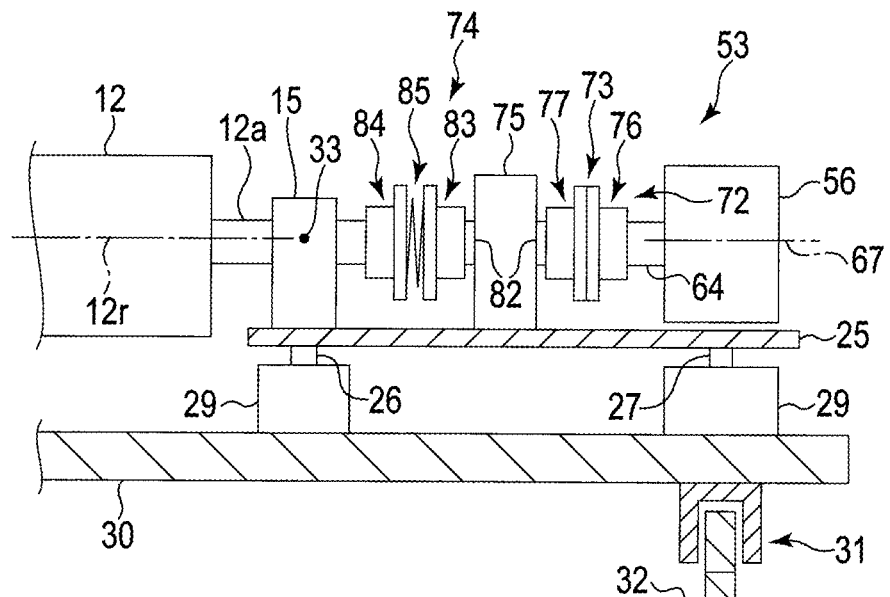
FIG. 3 is a side view showing the configurations of the first and third power transmission mechanisms of FIG. 2.

As shown in FIG. 1 through FIG. 3, a sheet/film manufacturing apparatus 1 includes a sheet/film forming roll unit, discharge unit 2, and temperature regulating unit 4. The sheet/film forming roll unit is constituted of a roll unit 3, push-pull unit 5, and drive unit 6.

The discharge unit 2 is configured to be able to discharge a molten resin 7a in a thin and spread form. The roll unit 3 is configured to be able to form the discharged molten resin 7a into a form (for example, shape and thickness) suitable for the use by means of a plurality rolls (first roll 12, second roll 13, and third roll 14) to be described later. The temperature regulating unit 4 is configured to be able to regulate the temperatures of the rolls 12, 13, and 14. The push-pull unit 5 is configured to be able to change the state (for example, posture, and angle) where the first and third rolls 12 and 14 are pressed against the second roll 13. The drive unit 6 is configured to be able to control the rotating state of each of the rolls 12, 13, and 14. Hereinafter, specific descriptions will be given.

[Discharge Unit 2]

As shown in FIG. 1, the discharge unit 2 includes an extruding unit 8, and T-die 9. The extruding unit 8 and the T-die 9 are coupled to each other through a connecting pipe 10. The extruding unit 8 is provided with a cylinder (not shown), and hopper 11. It should be noted that the extruding unit 8, T-die 9, and connecting pipe 10 are heated to a temperature set in advance, and are kept at the set temperature. The set temperature is a temperature higher than the set temperature of the rolls 12, 13, and 14 to be described later.

In the cylinder, one or a plurality of screws (not shown) are rotatably inserted. According to a specification in which one screw is inserted in the cylinder, a single-axis extruding unit is configured. According to a specification in which a plurality of (for example, two) screws are inserted in the cylinder, a biaxial extruding unit is configured.

The hopper 11 is configured to be able to put a resin material into the cylinder. For example, a pellet type resin material is put into the hopper 11. The put resin material is melted by the rotating screw and is kneaded in the cylinder. The molten/kneaded resin material is transcribed to the tip end of the cylinder in a molten state.

The molten resin transcribed to the tip end of the cylinder is fed into the T-die 9 from the connecting pipe 10. The T-die 9 is configured to be able to discharge the transcribed molten resin in a spreading manner. The molten resin 7a discharged from the T-die 9 is fed to the roll unit 3. As an example of a method of feeding the molten resin 7a, a specification according to which the molten resin 7a is discharged in the direction of gravity (vertical) from the T-die 9 is shown in the drawing.

[Roll Unit 3]

As shown in FIG. 1, FIG. 2, and FIG. 7 through FIG. 9, the roll unit 3 includes a first roll 12 (pushing roll), second roll 13 (reference roll), and third roll 14 (separating roll). Each of the first to third rolls 12 to 14 is configured to be able to be individually temperature-regulated by the temperature regulating unit 4 to be described later. Here, the shaft directions of the first to third rolls 12, 13, and 14 are defined as respective directions along first to third rotation central axes 12r, 13r, and 14r, which will be described later.

The first roll 12 has a first rotation central axis 12r. On both sides of the first roll 12, shaft parts rotatable with the first roll 12 (first drive shaft part 12a and second drive shaft part 12b) are respectively provided. The first and second drive shaft parts 12a and 12b are configured to be concentric with the first rotation central axis 12r. The first drive shaft part 12a is rotatably supported on a first bearing mechanism 15. The second drive shaft part 12b is rotatably supported on a second bearing mechanism 16. Thus, the first roll 12 is supported rotatable around the first rotation central axis 12r while the shaft parts 12a and 12b thereof being supported by the bearing mechanisms 15 and 16.

Furthermore, the first roll 12 has a cylindrical first transcription surface 12s. The first transcription surface 12s is a mirror-finished surface. The first roll 12 (first transcription surface 12s) is configured in such a manner that first roll 12 can be pressed against a second roll 13 (second transcription surface 13s) or can be separated from the second roll 13 (second transcription surface 13s) by the push-pull unit 5.

The second roll 13 has a second rotation central axis 13r. On both sides of the second roll 13, shaft parts rotatable with the second roll 13 (for example, a third drive shaft part 13a and a fourth drive shaft part 13b) are respectively provided. The third and fourth drive shaft parts 13a and 13b are configured to be concentric with the second rotation central axis 13r. The third drive shaft part 13a is rotatably supported on a third bearing mechanism 17. The fourth drive shaft part 13b is rotatably supported on a fourth bearing mechanism 18. Thus, the second roll 13 is supported rotatable around the second rotation central axis 13r while the shaft parts 13a and 13b thereof being supported by the bearing mechanisms 17 and 18.

Here, the third and fourth bearing mechanisms 17 and 18 are fixed to a base 30 through fixing parts 29 to be described later. Thereby, the second roll 13 having the third and fourth drive shaft parts 13a and 13b rotatably supported respectively on the third and fourth bearing mechanisms 17 and 18 is maintained in a state where the second roll 13 is fixed to a given position set in advance at all times.

Furthermore, the second roll 13 has a cylindrical second transcription surface 13s. The second transcription surface 13s is a mirror-finished surface. The second transcription surface 13s is configured to be able to guide the molten resin 7a discharged from the T-die in the gravity (vertical) direction in the sheet (film) feed direction Fd set in advance.

The third roll 14 has a third rotation central axis 14r. On both sides of the third roll 14, shaft parts rotatable with the third roll 14 (a fifth drive shaft part 14a and a sixth drive shaft part 14b) are respectively provided. The fifth and sixth drive shaft parts 14a and 14b are configured to be concentric with the third rotation central axis 14r. The fifth drive shaft part 14a is rotatably supported on a fifth bearing mechanism 19. The sixth drive shaft part 14b is rotatably supported on a sixth bearing mechanism 20. Thus, the third roll 14 is supported rotatable around the third rotation central axis 14r while the shaft parts 14a and 14b thereof being supported by the bearing mechanisms 19 and 20.

Furthermore, the third roll 14 has a cylindrical feed surface 14s. The feed surface 14s may not necessarily be a mirror-finished surface. For example, as will be described in an modified example of the fifth embodiment, a preset pattern may be formed on the feed surface 14s. The feed surface 14s is configured to be able to guide the molten resin 7b to be described later in the feed direction Fd.

In this case, the first to third rolls 12, 13 and 14 are controlled to be in the same rotating state with each other (for example, the rotational speed and the number of revolutions). For example, with reference to the rotating state of the second roll 13, the rotating states of the first and third rolls 12 and 14 are controlled. Thus, the first and third rolls 12 and 14 can be rotated in synchronism with the second roll 13.

As one example of the layout of the first to third rolls 12, 13, and 14, a specification in which the first to third rolls 12, 13, and 14 are transversely arranged is shown in the drawings. In the transverse arrangement, the first to third rolls 12, 13, and 14 (i.e., first to third rotation central axes 12r, 13r, and 14r) are arranged in the horizontal direction in parallel with each other and at the identical height.

Furthermore, the first to third rolls 12, 13, and 14 may be configured to have diameters identical to each other or may be configured to have diameters different from each other.

When the first to third rolls 12, 13, and 14 having diameters different from each other are configured, it is desirable that the diameter of the first roll 12 be set smaller than the diameter of the second roll 13. Thereby, it is possible to improve or maintain constant the responsibility or the followability of the first roll 12.

Here, the responsibility of the first roll 12 implies a speed of response of, for example, a case where the first roll 12 is to be pressed against the second roll 13. The followability of the first roll 12 implies a rotational follow-up speed of the first roll 12, for example, in a state where the first roll 12 is pressed against the second roll 13.

In such a configuration, the molten resin 7a discharged from the discharge unit 2 (T-die 9) in the gravity (vertical) direction in a thin and spread form passes through a part (contact point G1 (see FIG. 1)) between the first roll 12 and the second roll 13. The molten resin 7a which has passed through the contact point G1 is cooled while the resin 7a is pushed out along the second transcription surface 13s of the second roll 13, and becomes a molten resin 7b only the surface of which has become solidified. The molten resin 7b passes through a part (contact point G2 (see FIG. 1)) between the second roll 12 and the third roll 13, and thereafter becomes a sheet (film) 7c in a solidified state the whole of which has flexibility. Thus, the sheet (film) 7c is sent in the direction Fd of arrow. At this time, the sheet (film) 7c has a form (for example, shape, and thickness) corresponding to the use.

Furthermore, the total lengths of the first to third rolls 12, 13, and 14 are set to lengths identical to each other. The total lengths of the rolls 12, 13, and 14 are defined as lengths in a direction (longitudinal direction) parallel to the first to third rotation central axes 12r, 13r, and 14r. In other words, the total lengths of the rolls 12, 13, and 14 are defined as distances between both ends of the rolls 12, 13, and 14. In this case, in the state where the first to third rolls 12, 13, and 14 are transversely arranged, the both ends of the rolls 12, 13, and 14 are linearly lined up along a direction perpendicular to the rotation central axes 12r, 13r, and 14r.

Here, in the first to sixth bearing mechanisms 15, 16, 17, 18, 19, and 20 on which the first to sixth drive shaft parts 12a, 12b, 13a, 13b, 14a, and 14b of the first to third rolls 12, 13, and 14 are rotatably supported, the first bearing mechanism 15, the third bearing mechanism 17, and the fifth bearing mechanism 19 are linearly lined up in the direction perpendicular to the first to third rotation central axes 12r, 13r, and 14r. Likewise, the second bearing mechanism, the fourth bearing mechanism, and the sixth bearing mechanism are linearly lined up in the direction perpendicular to the first to third rotation central axes 12r, 13r, and 14r. In short, the positions at which the rolls 12, 13, and 14 are rotatably supported are set at positions identical to each other along the direction perpendicular to the first to third rotation central axes 12r, 13r, and 14r.

It should be noted that as the layout of the first to third rolls 12, 13, and 14, longitudinal arrangement or oblique arrangement may be employed in place of the above-mentioned transverse arrangement although not particularly shown. In the longitudinal arrangement, the first to third rolls 12, 13, and 14 (i.e., first to third rotation central axes 12r, 13r, and 14r) are arranged in parallel with each other in the gravity (vertical) direction. Further, in the oblique arrangement, the second roll 13 (second rotation central axis 13r) is arranged at the center, and the first roll 12 (first rotation central axis 12r) and the third roll 14 (third rotation central axis 14r) are arranged on both sides of the second roll 13 in an inclined state.

Furthermore, the first to third rolls 12, 13, and 14 may be arranged in such a manner that the third rotation central axis 14r is not positioned in the same plane as the first and second rotation central axes 12r and 13r. Further, the first to third rolls 12, 13, and 14 may be arranged so that the first and the third rolls 12 and 14 can be moved along the outer circumference of the second roll 13.

Furthermore, in order to compensate for deficiency in cooling of the molten resin, a fourth roll (not shown) may be provided on the downstream side of the third roll 14. Further, regarding the third roll 14, although the roll 14 is made a constituent article of the roll unit 3 of this embodiment, the third roll 14 may be made a constituent article of another unit (not shown) according to the intended purpose or the usage environment.

Figure 7:
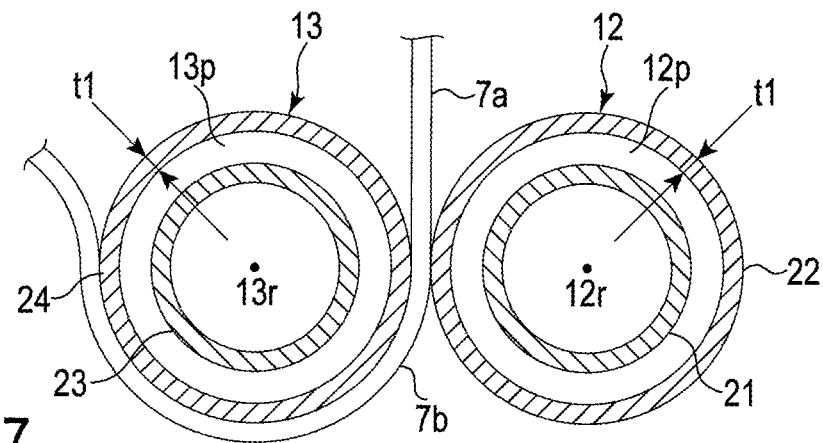
FIG. 7 is a cross-sectional view of a first and second rolls associated with a compression state.
Figure 8:
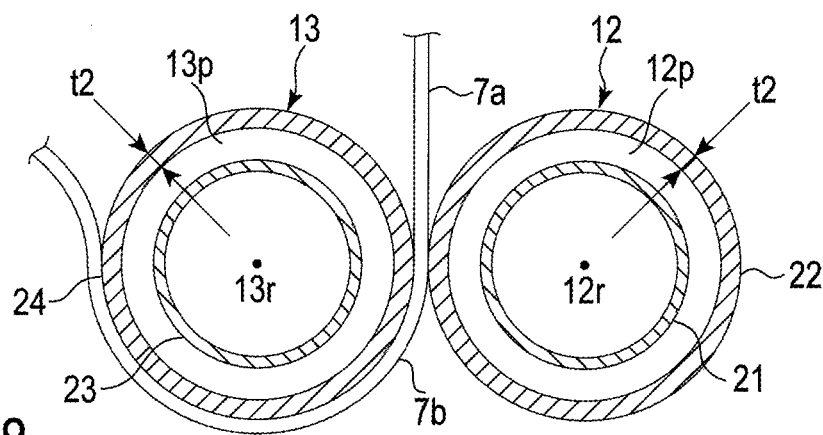
FIG. 8 is a cross-sectional view of the first and second rolls associated with a press state.
Figure 9:
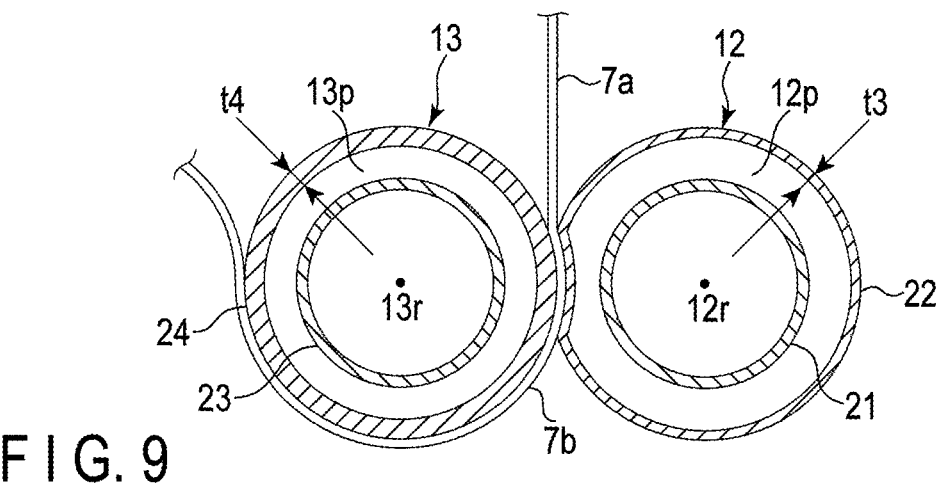
FIG. 9 is a cross-sectional view of the first and second rolls associated with a touch/contact state.

It should be noted that in FIG. 7 through FIG. 9, the internal structure of each of the rolls 12, 13, and 14 corresponding to the state of contact (for example, contact pressure) between the first roll 12 (first transcription surface 12s) and the second roll 13 (second transcription surface 13s) is shown. Such a contact state (contact pressure) is set in accordance with, for example, the type of the resin, thickness of the sheet (film), use, and the like. In setting the contact state (contact pressure), the state where the first roll 12 is pressed against the second roll 13 is adjusted by, for example, the push-pull unit 5 to be described later.

In FIG. 7, the internal structures of the first and second rolls 12 and 13 associated with the compression state are shown. The first roll 12 is configured in such a manner that a first outer cylinder 22 is arranged on the outside of a first inner cylinder 21. The second roll 13 is configured in such a manner that a second outer cylinder 24 is arranged on the outside of a second inner cylinder 23. The thickness t1 of each of the first outer cylinder 22 and the second outer cylinder 24 is set within a range of 30 mm≤t1≤60 mm. The contact pressure (linear pressure) in the compression state is set within a range of 30 kgf/cm to 100 kgf/cm.

In FIG. 8, the internal structures of the first and second rolls 12 and 13 associated with the press state are shown. The first roll 12 is configured in such a manner that the first outer cylinder 22 is arranged on the outside of the first inner cylinder 21. The second roll 13 is configured in such a manner that the second outer cylinder 24 is arranged on the outside of the second inner cylinder 23. The thickness t2 of each of the first outer cylinder 22 and the second outer cylinder 24 is set within a range of 10 mm≤t2≤50 mm. The contact pressure (linear pressure) in the press state is set within a range of 20 kgf/cm to 60 kgf/cm.

In FIG. 9, the internal structures of the first and second rolls 12 and 13 associated with the touch/contact state are shown. The first roll 12 is configured in such a manner that the first outer cylinder 22 is arranged on the outside of the first inner cylinder 21. The second roll 13 is configured in such a manner that the second outer cylinder 24 is arranged on the outside of the second inner cylinder 23.

Here, when the first outer cylinder 22 has elasticity, the thickness t3 of the first outer cylinder 22 is set within a range of 1 mm≤t3≤10 mm, and the thickness t4 of the second outer cylinder 24 is set within a range of 10 mm≥t4≤60 mm. The contact pressure (linear pressure) in the touch/contact state is set within the range of 5 kgf/cm to 50 kgf/cm.

Further, when the first cylinder 22 is thin-walled, the thickness t3 of the first outer cylinder 22 is set within a range of 0.1 mm≤t3≤1 mm, and the thickness t4 of the second outer cylinder 24 is set within a range of 10 mm≤t4≤60 mm. The contact pressure (linear pressure) in the touch/contact state is set within a range of 1 kgf/cm to 10 kgf/cm.

[Temperature Regulating Unit 4]

As shown in FIG. 2, and FIG. 7 through FIG. 9, the temperature regulating unit 4 is configured to be able to individually regulate the temperature of each of the first to third rolls 12, 13, and 14 to a temperature set in advance, and maintain the temperature thereof at the set temperature. As the set temperature of the first to third rolls 12, 13, and 14, for example, a temperature at which the molten resin is not further melted, and the molten resin can maintain softness while being solidified is assumed.

The temperature regulating unit 4 includes first piping 4a, second piping 4b, and third piping 4c. The first to third piping members 4a, 4b, and 4c are configured in such a manner that a temperature regulating medium is supplied to them from a supply source (not shown). As an example of the temperature regulating medium, liquid (for example, water and oil) and a coolant can be assumed.

The first piping 4a is configured, for example, from the second drive shaft part 12b to the inside of the first roll 12. Inside the first roll 12, the first piping 4a is continuous with a first annular area 12p. The first annular area 12p is configured to be continuous between the first inner cylinder 21 and the first outer cylinder 22 in the circumferential direction. In such a configuration, the temperature regulating medium supplied to the first piping 4a flows from the inside of the first roll 12 through the first annular area 12p, and is thereafter collected again through the first piping 4a. Thereby, the temperature of the first roll 12 (first transcription surface 12s) is adjusted to the temperature set in advance, and is kept at the set temperature.

The second piping 4b is configured, for example, from the fourth drive shaft part 13b to the inside of the second roll 13. Inside the second roll 13, the second piping 4b is continuous with a second annular area 13p. The second annular area 13p is configured to be continuous between the second inner cylinder 23 and the second outer cylinder 24 in the circumferential direction. In such a configuration, the temperature regulating medium supplied to the second piping 4b flows from the inside of the second roll 13 through the second annular area 13p, and is thereafter collected again through the second piping 4b. Thereby, the temperature of the second roll 13 (second transcription surface 13s) is adjusted to the temperature set in advance, and is kept at the set temperature.

The third piping 4c is configured, for example, from the sixth drive shaft part 14b to the inside of the third roll 14. Inside the third roll 14, the third piping 4c is continuous with a third annular area (not shown). The third annular area is configured to be continuous between the third inner cylinder and the third outer cylinder which are not shown in the circumferential direction. In such a configuration, the temperature regulating medium supplied to the third piping 4c flows from the inside of the third roll 14 through the third annular area, and is thereafter collected again through the third piping 4c. Thereby, the temperature of the third roll 14 (feed surface 14s) is adjusted to the temperature set in advance, and is kept at the set temperature.

[Push-Pull Unit 5]

As shown in FIG. 2, FIG. 3, and FIG. 10, the push-pull unit 5 includes first to fourth push-pull mechanisms 5a, 5b, 5c, and 5d, supporting plates 25 and 34, and linear guides 26 to 28, and 35 to 37.

[First and Second Push-Pull Mechanisms 5a and 5b]

The first push-pull mechanism 5a and the second push-pull mechanism 5b are arranged respectively, for example, on both sides of the first roll 12.

The first push-pull mechanism 5a is configured to be able to exert pressing force and traction force on the first bearing mechanism 15. The first bearing mechanism 15 is supported on the supporting plate 25. On the supporting plate 25, a first drive mechanism 53 (drive unit 6) to be described later is mounted. The supporting plate 25 is configured to be able to move along, for example, two linear guides 26 and 27. The two linear guides 26 and 27 are arranged in parallel with each other and in opposition to each other. The linear guides 26 and 27 are configured in a direction perpendicular to the second rotation central axis 13r (see FIG. 1) of the second roll 13.

The second push-pull mechanism 5b is configured to be able to exert pressing force and traction force on the second bearing mechanism 16. The second bearing mechanism 16 is configured to be able to move along, for example, one linear guide 28. The linear guide 28 is configured in a direction perpendicular to the second rotation central axis 13r of the second roll 13.

In this case, the three linear guides 26, 27, and 28 described above are arranged in parallel with each other and in opposition to each other. These three linear guides 26, 27, and 28 are respectively fixed to, for example, three fixing parts 29 on a one-to-one basis. Each of the fixing parts 29 is provided on the base 30. The base 30 is configured in such a manner that the base 30 can be attached to a place 32 set in advance by means of mounting mechanisms 31 (see FIG. 3). It should be noticed that as the place 32 set in advance, a place at which the first to third rolls 12, 13, and 14 can be laid out in the transverse, longitudinal or oblique arrangement is assumed.

In such a configuration, pressing force or traction force is exerted on the first bearing mechanism 15. The acting force at that time is transmitted from the first bearing mechanism 15 to the supporting plate 25. By the acting force, the supporting plate 25 moves along the linear guides 26 and 27. Following the movement of the supporting plate 25, the first bearing mechanism 15 moves together with the first drive mechanism 53 (drive unit 6). On the other hand, pressing force or traction force is exerted on the second bearing mechanism 16. By the acting force at that time, the second bearing mechanism 16 moves along the linear guide 28.

It should be noted that it is desirable that the part (i.e., pressure application part 33) at which the pressing force or the traction force is exerted on the first or second bearing mechanism 15 or 16 by the first or second push-pull mechanisms 5a or 5b be set at, for example, a position intersecting or perpendicularly intersecting the first rotation central axis 12r of the first roll 12, and opposed to a position immediately above the linear guide 26.

For example, in the case of the specification (see FIG. 2) in which the first to third rolls 12, 13, and 14 are arranged in the horizontal direction in parallel with each other and at the same height (i.e., in transverse arrangement), it is sufficient if the pressing force or the traction force is exerted on the first and second bearing mechanisms 15 and 16 in the horizontal direction and in the direction perpendicular to the first rotation central axis 12r. It should be noted that in FIG. 3, the pressure application part 33 of the first bearing mechanism 15 is shown.

As described above, on the first bearing mechanism 15, the first drive shaft part 12a of the first roll 12 is supported. On the second bearing mechanism 16, the second drive shaft part 12b of the first roll 12 is supported. Accordingly, when the first and second bearing mechanisms 15 and 16 are moved, following the movement, the first and second drive shaft parts 12a and 12b move. At this time, together with the first and second drive shaft parts 12a and 12b, the first roll 12 moves. Thus, it is possible to move the first roll 12 toward or away from the second roll 13.

At this time, the timing with which the pressing force or the traction force is exerted on the first and second bearing mechanisms 15 and 16 is controlled. For example, pressing force is exerted on the first bearing mechanism 15, and traction force is exerted on the second bearing mechanism 16. Traction force is exerted on the first bearing mechanism 15, and pressing force is exerted on the second bearing mechanism 16. Pressing force is exerted on the first bearing mechanism 15 and the second bearing mechanism 16 or traction force is exerted on the first bearing mechanism 15 and the second bearing mechanism 16. Thereby, it is possible to adjust the state (for example, posture and angle) where the first roll 12 is pressed against the second roll 13 with a high degree of accuracy and a high degree of resolution.

[Third and Fourth Push-Pull Mechanisms 5c and 5d]

The third push-pull mechanism 5c and the fourth push-pull mechanism 5d are arranged respectively, for example, on both sides of the third roll 14.

The third push-pull mechanism 5c is configured to be able to exert pressing force and traction force on the fifth bearing mechanism 19. The fifth bearing mechanism 19 is supported on the supporting plate 34. On the supporting plate 34, a third drive mechanism 55 (drive unit 6) to be described later is mounted. The supporting plate 34 is configured to be able to move along, for example, two linear guides 35 and 36. The two linear guides 35 and 36 are arranged in parallel with each other and in opposition to each other. The linear guides 35 and 36 are configured in a direction perpendicular to the second rotation central axis 13r (see FIG. 1) of the second roll 13.

The fourth push-pull mechanism 5d is configured to be able to exert pressing force and traction force on the sixth bearing mechanism 20. The sixth bearing mechanism 20 is configured to be able to move along, for example, one linear guide 37. The linear guide 37 is configured in a direction perpendicular to the second rotation central axis 13r of the second roll 13.

In this case, the three linear guides 35, 36, and 37 described above are arranged in parallel with each other and in opposition to each other. These three linear guides 35, 36, and 37 are respectively fixed to the three fixing parts 29 described above on a one-to-one basis.

In such a configuration, pressing force or traction force is exerted on the fifth bearing mechanism 19. The acting force at that time is transmitted from the fifth bearing mechanism 19 to the supporting plate 34. By the acting force, the supporting plate 34 moves along the linear guides 35 and 36. Following the movement of the supporting plate 34, the fifth bearing mechanism 19 moves together with the third drive mechanism 55 (drive unit 6). On the other hand, pressing force or traction force is exerted on the sixth bearing mechanism 20. By the acting force at that time, the sixth bearing mechanism 20 moves along the linear guide 37.

It should be noted that it is desirable that the part (i.e., pressure application part) at which the pressing force or the traction force is exerted on the fifth or sixth bearing mechanism 19 or 20 by the third or fourth push-pull mechanism 5c or 5d be set at, although not particularly shown, for example, a position intersecting or perpendicularly intersecting the third rotation central axis 14r of the third roll 14, and opposed to a position immediately above the linear guide 35.

For example, in the case of the specification (see FIG. 2) in which the first to third rolls 12, 13, and 14 are arranged in the horizontal direction in parallel with each other and at the same height (i.e., in transverse arrangement), it is sufficient if the pressing force or the traction force is exerted on the fifth and sixth bearing mechanisms 19 and 20 in the horizontal direction and in the direction perpendicular to the third rotation central axis 14r.

As described above, on the fifth bearing mechanism 19, the fifth drive shaft part 14a of the third roll 14 is supported. On the sixth bearing mechanism 20, the sixth drive shaft part 14b of the third roll 14 is supported. Accordingly, when the fifth and sixth bearing mechanisms 19 and 20 are moved, following the movement, the fifth and sixth drive shaft parts 14a and 14b move. At this time, together with the fifth and sixth drive shaft parts 14a and 14b, the third roll 14 moves. Thus, it is possible to move the third roll 14 toward or away from the second roll 13.

At this time, the timing with which the pressing force or the traction force is exerted on the fifth and sixth bearing mechanisms 19 and 20 is controlled. For example, pressing force is exerted on the fifth bearing mechanism 19, and traction force is exerted on the sixth bearing mechanism 20. Traction force is exerted on the fifth bearing mechanism 19, and pressing force is exerted on the sixth bearing mechanism 20. Pressing force is exerted on the fifth bearing mechanism 19 and the sixth bearing mechanism 20 or traction force is exerted on the fifth bearing mechanism 19 and the sixth bearing mechanism 20. Thereby, it is possible to adjust the state (for example, posture and angle) where the third roll 14 is pressed against the second roll 13 with a high degree of accuracy and a high degree of resolution.

[Apparatus Configuration of First to Fourth Push-Pull Mechanisms 5a, 5b, 5c, and 5d]

Apparatus configurations identical to each other can be applied the aforementioned first to fourth push-pull mechanisms 5a, 5b, 5c, and 5d. In FIG. 10, as one example, an apparatus configuration of the second push-pull mechanism 5b is shown. The push-pull mechanism 5b includes a hydraulic servo type actuator 38, and control unit 39. The actuator 38 is configured to be able to exert pressing force or traction force on the second bearing mechanism 16. The control unit 39 is configured to be able to control the actuator 38. Hereinafter, specific descriptions will be given.

As shown in FIG. 10, the actuator 38 includes a cylinder main body 40, coupling cylinder 41, supporting frame 42, piston 43, and piston rod 44. Inside the cylinder main body 40, a cylinder 45 is configured. To the cylinder main body 40, the coupling cylinder 41 is coupled. The coupling cylinder 41 is supported on the supporting frame 42. That is, the cylinder main body 40 is supported on the supporting frame 42 through the coupling cylinder 41.

In the cylinder 45 of the cylinder main body 40, the piston 43 is accommodated. The piston 43 is configured to be able to move along the cylinder 45 in a reciprocating manner. Inside the cylinder 45, a forward chamber 45a and backward chamber 45b are configured on both sides of the piston 43.

The piston rod 44 is configured to extend from the backward chamber 45b along the cylinder main body 40 and the coupling cylinder 41 in a penetrating manner. A base end of the piston rod 44 is connected to the piston 43, and a tip end thereof is connected to the aforementioned pressure application part 33 (see FIG. 3).

Here, the forward chamber 45a is pressurized by the control unit 39 and, at the same time, the backward chamber 45b is decompressed. At this time, the piston 43 moves forward. Pressing force is exerted on the pressure application part 33 at the tip end of the piston rod 44. The pressing force is exerted on the second bearing mechanism 16.

Thereby, it is possible to move the second bearing mechanism 16 forward along the linear guide 28.

Conversely, the forward chamber 45a is decompressed by the control unit 39 and, at the same time, the backward chamber 45b is pressurized. At this time, the piston 43 moves backward. Traction force is exerted on the pressure application part 33 at the tip end of the piston rod 44. The traction force is exerted on the second bearing mechanism 16. Thereby, it is possible to move the second bearing mechanism 16 backward along the linear guide 28.

Furthermore, the control unit 39 includes a controller 46, servo motor 47, bidirectional pump 48, first measuring instrument 49, second measuring instrument 50, load cell 51, and pressure sensor 52. Here, as an example, a control unit 39 configured to operate the actuator 38 by hydraulic pressure is assumed.

The controller 46 is configured to be able to control the servo motor 47 on the basis of output signals (measurement results) to be described later. The servo motor 47 is configured to be able to selectively control the pressure to be exerted on the forward chamber 45a or the backward chamber 45b by driving the bidirectional pump 48.

In the hydraulic servo system, when the forward chamber 45a is to be pressurized, oil is supplied from the bidirectional pump 48 to the forward chamber 45a, whereby the hydraulic pressure in the forward chamber 45a is raised. Thus, it is possible to exert pressing force on the second bearing mechanism 16 as described above. Conversely, when the backward chamber 45b is to be pressurized, oil is supplied from the bidirectional pump 48 to the backward chamber 45b, whereby the hydraulic pressure in the backward chamber 45b is raised. Thus, it is possible to exert traction force on the second bearing mechanism 16 as described above.

When pressing force or traction force is exerted on the second bearing mechanism 16, the controller 46 controls the bidirectional pump 48 by means of the servo motor 47 on the basis of output signals (measurement results) from the first measuring instrument 49, second measuring instrument 50, load cell 51, and pressure sensor 52. For example, the controller 46 controls the timing for supplying oil to the forward chamber 45a or the backward chamber 45b, an increment in hydraulic pressure, and the like.

Here, the first measuring instrument 49 is configured to be able to measure the position of the piston 43 in the cylinder main body 40 (cylinder 45), and output the measurement result. The second measuring instrument 50 is configured to be able to measure the position of the second bearing mechanism 16, and output the measurement result. The load cell 51 is configured to be able to measure the load exerted on the coupling cylinder 41, and output the measurement result. The pressure sensor 52 is configured to be able to measure the hydraulic pressure in the forward chamber 45a or the backward chamber 45b, and output the measurement result.

Thereby, it is possible to exert pressing force or traction force on the second bearing mechanism 16 with high accuracy. As a result, it is possible to vary the state (for example, posture and angle) where the first roll 12 is pressed against the second roll 13 with a high degree of accuracy.

It should be noticed that as the first to fourth push-pull mechanisms 5a, 5b, 5c, and 5d, in place of the aforementioned hydraulic servo system, although not particularly shown, a system in which the state (for example, posture and angle) where the first or the third roll 12 or 14 is pressed against the second roll 13 is changed by moving a screw or a wedge forward or backward may be employed. Further, the supporting plates 25 and 34 are not necessarily indispensable configurations. It is sufficient if the structure enables the first and third drive mechanisms 53 and 55 (drive unit 6) to be described later to follow the movement of the first and fifth bearing mechanisms 15 and 19.

[Drive Unit 6]

As shown in FIG. 1 through FIG. 3, and FIG. 11 through FIG. 14, the drive unit 6 includes a first drive mechanism 53, second drive mechanism 54, and third drive mechanism 55. It should be noticed that the drive unit 6 includes a controller (not shown) configured to control first to third motors 56, 57, and 58 to be described later. Thereby, it is possible to collectively or individually control the rotating states (for example, numbers of revolutions, and rotational speeds) of the first to third rolls 12, 13, and 14. Hereinafter, specific descriptions will be given.

[First to Third Motors 56, 57, and 58]

As the first to third motors 56, 57, and 58, multipolar motors using a plurality of permanent magnets are applied. In this case, any types of motors including an inner rotor type motor, and outer rotor type motor are applicable. In the inner rotor type motor, a rotor is rotatably arranged inside a stator. In the outer rotor type motor, a rotor is rotatably arranged outside a stator. Either type of motor can be configured by, for example, arranging a plurality of coils on the stator, and arranging a plurality of permanent magnets on the rotor.

In FIG. 11, as an example of the first to third motors 56, 57, and 58, an inner rotor type multipolar motor in which the number of poles is eight, and the number of slots is fifteen is shown. The multipolar motor is configured in such a manner that a rotor 59 (rotating part) can rotate inside a stator 60. On the outer circumference of the rotor 59 (rotating part), a plurality of permanent magnets 61 are arranged in the circumferential direction. Along the outer circumference of the rotor 59 (rotating part), S poles and N poles are alternately arranged. On the inner circumference of the stator 60, a plurality of coils 62 are arranged in the inner circumferential direction. In such a configuration, the multipolar motor is controlled by the controller. Thus, it is possible to rotate the rotor 59 (rotating part) inside the stator 60.

Here, it is desirable that the second motor 57 directly contributing to the rotation of the second roll 13 should have a specification which enables generation of high torque at a low rotational speed. In this case, it is desirable, regarding the second motor 57, that the number of poles be set to 8 or more, and the number of slots be set to 15 or more. More desirably, regarding the second motor 57, the number of poles is set to 20 or more, and the number of slots is set to 24 or more. Thereby, on the basis of a particular power-supply specification, as the number of poles becomes larger, the second motor 57 rotates at a lower rotational speed, and generates higher torque.

It should be noted that regarding the first motor 56 and the third motor 58, a first specification which enables generation of low torque at a high rotational speed may be applied, or a second specification which enables generation of high torque at a low rotational speed as in the case of the second motor 57 may also be applied. It should be noted that regarding the first specification, it is necessary to separately provide a speed reducer.

In the sheet/film manufacturing apparatus 1 of this embodiment, the practical rotational speed of the second roll 13 is within the range of 0 to 100 rpm. In such a low rotational speed range, the molten resin 7a (see FIG. 1) is passed through a part (contact point) between the first roll 12 and the second roll 13, and is sent in the direction Fd of arrow. For this reason, it is necessary to impart rotational torque sufficient for such feeding to the second roll 13. It is desirable that the number of poles of the permanent magnets 61 be set to 20 or more as the structural requirement for the second motor 57 for satisfying the above condition.

In this case, it is desirable that the number of slots be set to 24 or more. It should be noted that as the method of calculating the number of slots, in, for example, WO2011/114574 "permanent magnet motor" (applicant: Mitsubishi Electric Corporation), the following relational expression is shown.

$$Z/\{3 \text{ (phase)} \times 2P\} = 2/5 \text{ (or 2/7)}$$

Z: number of slots

2P: number of poles (P: natural number)

The number (20) of poles is substituted into the above relational expression. Then, the number of slot is calculated as 24. Thereby, it is possible to generate optimum rotational torque within the range of the practical rotational speed (0 to 100 rpm) of the second roll 13.

[Arrangement Specification of First to Third Rotating Shaft Parts 64, 65, and 66]

Here, in FIG. 12 through FIG. 14, specifications of arranging first to third rotating shaft parts 64, 65, and 66 to be described later at rotating parts (rotors 59) of the first to third motors 56, 57, and 58 are shown.

In the specification of FIG. 12, the rotating part is configured as a hollow cylinder part 63. The hollow cylinder part 63 is configured by making the rotation center of the rotor 59 (see FIG. 11) concentrically depressed. Into such a hollow cylinder part 63 (rotating part), the first to third rotating shaft parts 64, 65, and 66 are fitted.

In this state, rotation centers of the first to third rotating shaft parts 64, 65, and 66, and the rotating parts (rotors 59) coincide with each other on one rotation central axis 67. Thus, the first to third rotating shaft parts 64, 65, and 66 become rotatable together with the rotating parts (rotors 59). Accordingly, it becomes possible to transmit the rotating states (motor output and rotational motion) of the first to third motors 56, 57, and 58 to the outside through the first to third rotating shaft parts 64, 65, and 66.

In the specification of FIG. 13, the rotating part is set as an annular attaching surface 68 (see FIG. 12 and FIG. 14). The attaching surface 68 is configured in such a manner that the surface 68 concentrically spreads from the rotation central axis 67 of the rotor 59. To such an attaching surface 68 (rotating part), the first to third rotating shaft parts 64, 65, and 66 are concentrically attached. As the attaching method, a method using bolts for fastening, and the like can be assumed.

In FIG. 13, a bolt fastening method is shown as an example. For example, a disk-like flange part 69 is provided at an end of the first to third rotating shaft parts 64, 65, and 66. A plurality of fixing holes 71 (see FIG. 12 and FIG. 14) in which bolts 70 can be inserted are formed in both the flange part 69 and the attaching surface 68 (rotating part). The flange part 69 is brought into contact with the attaching surface (rotating part) in opposition thereto. Bolts 70 are inserted in the fixing holes 71 from the flange part 69 toward the attaching surface 68 (rotating part), and are tightened, thereby fixing the flange part 69.

In this state, the rotation centers of the first to third rotating shaft parts 64, 65, and 66, and the rotating parts (rotors 59) coincide with each other on the one rotation central axis 67. Thus, it becomes possible for the first to third rotating shaft parts 64, 65, and 66 to rotate together with the rotating parts (rotors 59).

In the specification of FIG. 14, the first to third rotating shaft parts 64, 65, and 66 are formed integral with the rotating parts (rotors 59). In this state, the rotation centers of the first to third rotating shaft parts 64, 65, and 66, and the rotating parts (rotors 59) coincide with each other on the one rotation central axis 67. Thus, it becomes possible for the first to third rotating shaft parts 64, 65, and 66 to rotate together with the rotating parts (rotors 59).

[First Drive Mechanism 53]

As shown in FIG. 1 through FIG. 3, the first drive mechanism 53 is coupled to the first drive shaft part 12*a* of the first roll 12. The first drive mechanism 53 is configured to be able to control the rotating state of the first roll 12. The first drive mechanism 53 includes the first rotating shaft part 64, first motor 56, and a first power transmission mechanism 72.

The first rotating shaft part 64 is arranged at the rotating part of the first motor 56. The rotating part is configured to be able to rotate together with the rotor 59 (see FIG. 11). The rotation center of the first rotating shaft part 64, the rotation center of the rotating part, and the rotation center of the first motor 56 (rotor 59) coincide with each other on the one rotation central axis 67. In such a state, it becomes possible to transmit the rotating state (motor output and rotational motion) of the first motor 56 to the outside through the first rotating shaft part 64 without incurring a loss.

In the first power transmission mechanism 72, an input part is formed on one side thereof in the power transmitting direction, and an output part is formed on the other side thereof in the power transmitting direction. The first power transmission mechanism 72 is arranged between the first motor 56 and the first roll 12. To the one side (input part) of the first power transmission mechanism 72, the first rotating shaft part 64 of the first motor 56 is coupled. To the other side (output part) of the first power transmission mechanism 72, the first drive shaft part 12*a* of the first roll 12 is coupled.

The first power transmission mechanism 72 is provided with a rigid coupling (shaft coupling) 73, flexible coupling (shaft coupling) 74, and reducer 75. On the supporting plate 25, the rigid coupling 73 and the flexible coupling 74 are respectively arranged on both sides of the reducer 75. In the drawings, as one example, the rigid coupling 73 is arranged between the first motor 56 and the reducer 75, and the flexible coupling 74 is arranged between the reducer 75 and the first bearing mechanism 15.

The rigid coupling 73 is provided with a first hub flange 76, and second hub flange 77. The first and second hub flanges 76 and 77 have shapes and sizes identical to each other.

The first hub flange 76 is provided with a disk-like first flange part 78, and cylindrical first attaching part 79. The first flange part 78 is formed integral with one end of the first attaching part 79. The first flange part 78 and the first attaching part 79 are concentrically arranged.

The second hub flange 77 is provided with a disk-like second flange part 80, and cylindrical second attaching part 81. The second flange part 80 is formed integral with one end of the second attaching part 81. The second flange part 80 and the second attaching part 81 are concentrically arranged.

In this case, for example, in a state where both the flange parts 78 and 80 are in contact with each other in opposition to each other, the flange parts 78 and 80 are fixed to each other by means of a plurality of bolts (not shown). Thus, the rigid coupling 73 having the first attaching part 79 and second attaching part 81 which outwardly protrude on both sides is configured. To the first attaching part 79, the first rotating shaft part 64 is coupled. The second attaching part 81 and the reducer 75 are coupled to each other by a coupling shaft 82.

The flexible coupling 74 is provided with a first hub flange 83, second hub flange 84, and leaf spring unit 85. The first and second hub flanges 83 and 84 have shapes and sizes identical to each other.

The first hub flange 83 is provided with a disk-like first flange part 86, and cylindrical first attaching part 87. The first flange part 86 is formed integral with one end of the first attaching part 87. The first flange part 86 and the first attaching part 87 are concentrically arranged.

The second hub flange 84 is provided with a disk-like second flange part 88, and cylindrical second attaching part 89. The second flange part 88 is formed integral with one end of the second attaching part 89. The second flange part 88 and the second attaching part 89 are concentrically arranged.

Figure 15:
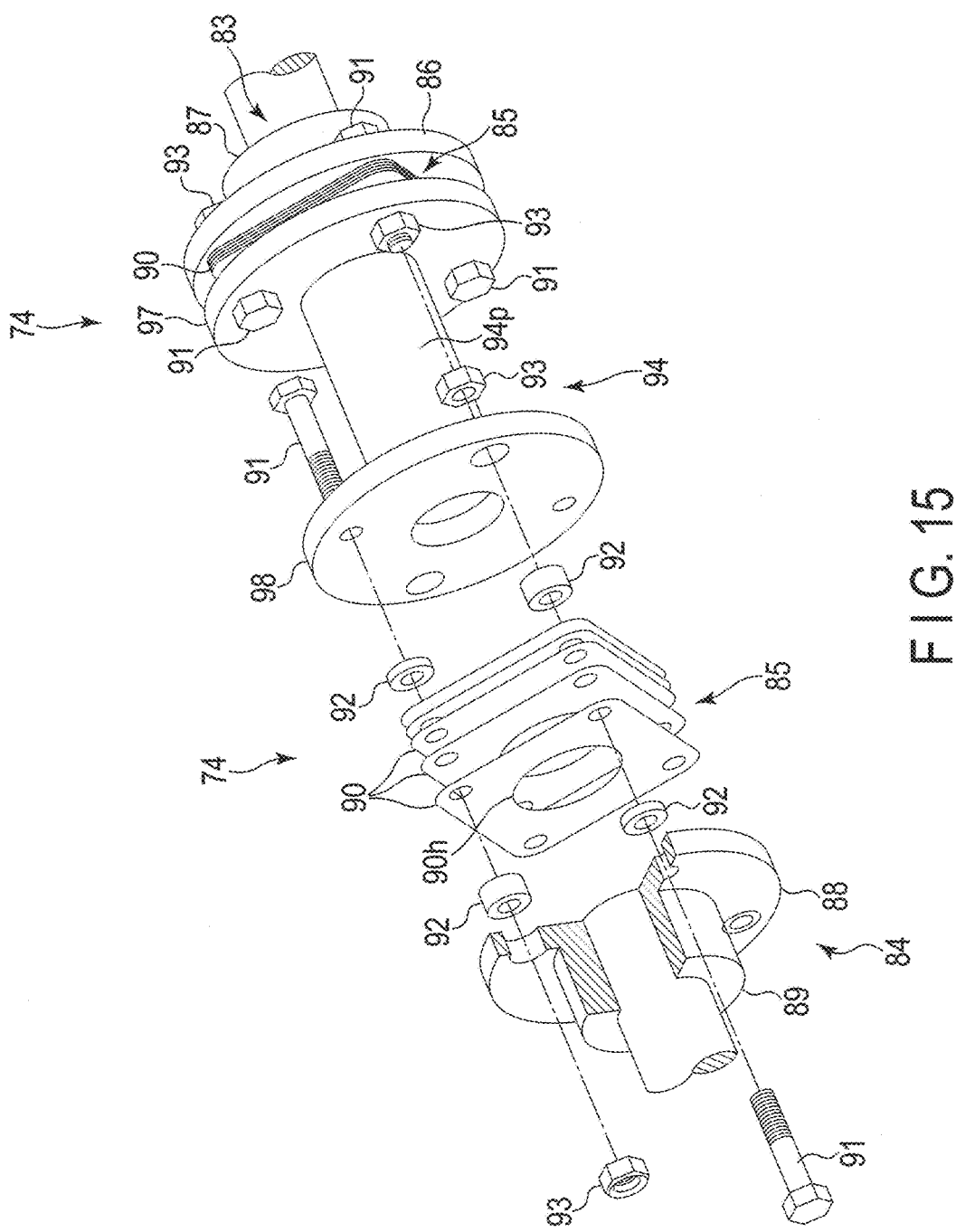
FIG. 15 is a perspective view showing the configuration of a second power transmission mechanism.

The leaf spring unit 85 is configured by piling a plurality of leaf springs 90 one on top of another into a laminated form (see FIG. 15). In the drawings, as an example, the leaf spring 90 has a plate-like rectangular shape. In the leaf spring 90, a circular through-hole 90h is formed in the central part thereof. Thereby, the leaf spring 90 light in weight and excellent in spring property is configured.

In this case, for example, both the flange parts 86 and 88 are arranged in opposition to each other, and the leaf spring unit 85 is arranged between the flange parts 86 and 88. The flange parts 86 and 88 are fixed to each other together with the leaf spring unit 85 by means of a plurality of bolts 91, washers 92, and nuts 93 (see FIG. 15). Thus, the flexible coupling 74 having the first attaching part 87 and second attaching part 89 which outwardly protrude on both sides is configured. The first attaching part 87 and the reducer 75 are coupled to each other by the coupling shaft 82. To the second attaching part 89, the first drive shaft part 12a supported on the first bearing mechanism 15 is coupled.

It should be noticed that in, for example, FIG. 15, an example of the flexible coupling 74 provided with a spacer 94 (intermediate shaft part) is shown. In this case, in a state where the spacer 94 is excluded, the leaf spring unit 85 is interposed between the hub flanges 83 and 84 (flange parts 86 and 88) on both sides. The flange parts 86 and 88 are fixed to each other together with the leaf spring unit 85 by means of bolts 91 and the like. Thereby, it is possible to configure the flexible coupling 74.

According to such a configuration, the first motor 56 is coupled to the first roll 12 through the first rotating shaft part 64, first power transmission mechanism 72, and first drive shaft part 12a. Here, the first motor 56 is controlled by the controller (not shown). The rotating state (motor output and rotational motion) of the first motor 56 is transmitted to the first drive shaft part 12a through the first rotating shaft part 64 and first power transmission mechanism 72. When the first drive shaft part 12a rotates, the second drive shaft part 12b rotates at the same time. Thus, it becomes possible to control the rotating state (for example, number of revolutions, and rotational speed) of the first roll 12. In this case, the rotating state (motor output and rotational motion) of the first motor 56 is transmitted to the first roll 12 in a state where the rotational speed is reduced and the torque is increased by the first power transmission mechanism 72 (reducer 75).

[Second Drive Mechanism 54]

As shown in FIG. 1 through FIG. 3, the second drive mechanism 54 is coupled to the third drive shaft part 13a of the second roll 13. The second drive mechanism 54 is configured to be able to control the rotating state of the second roll 13. The second drive mechanism 54 includes the second rotating shaft part 65, second motor 57, and a second power transmission mechanism 95.

The second rotating shaft part 65 is arranged at the rotating part of the second motor 57. The rotating part is configured to be able to rotate together with the rotor 59 (see FIG. 11). The rotation center of the second rotating shaft part 65, the rotation center of the rotating part, and the rotation center of the second motor 57 (rotor 59) coincide with each other on the one rotation central axis 67. In such a state, it becomes possible to transmit the rotating state (motor output and rotational motion) of the second motor 57 to the outside through the second rotating shaft part 65 without incurring a loss.

In the second power transmission mechanism 95, an input part is formed on one side thereof in the power transmitting direction, and an output part is formed on the other side thereof in the power transmitting direction. The second power transmission mechanism 95 is arranged between the second motor 57 and the second roll 13. To the one side (input part) of the second power transmission mechanism 95, the second rotating shaft part 65 of the second motor 57 is coupled. To the other side (output part) of the second power transmission mechanism 95, the third drive shaft part 13a of the second roll 13 is coupled.

The second power transmission mechanism 95 is provided with a flexible coupling 74. The flexible coupling 74 is arranged between the second motor 57 and the third bearing mechanism 17. The flexible coupling 74 is provided with a first hub flange 83, second hub flange 84, and leaf spring unit 85. The first and second hub flanges 83 and 84 have shapes and sizes identical to each other.

In the flexible coupling 74 of the second power transmission mechanism 95, the first attaching part 87 and the second attaching part 89 are elongated according to the distance between the second motor 57 and the third bearing mechanism 17. To the first attaching part 87, the second rotating shaft part 65 is coupled. To the second attaching part 89, the third drive shaft part 13a supported on the third bearing mechanism 17 is coupled. Configurations other than the above are identical to the flexible coupling 74 of the first power transmission mechanism 72. Accordingly, the configurations identical to the flexible coupling 74 of the first power transmission mechanism 72 are denoted by reference symbols identical to those of the mechanism 72, and descriptions of them are omitted.

According to such a configuration, the second motor 57 is coupled to the second roll 13 through the second rotating shaft part 65, second power transmission mechanism 95, and third drive shaft part 13a. Here, the second motor 57 is controlled by the controller (not shown). The rotating state (motor output and rotational motion) of the second motor 57 is transmitted to the third drive shaft part 13a through the second rotating shaft part 65, and second power transmission mechanism 95. The third drive shaft part 13a rotates, and the fourth drive shaft part 13b rotates at the same time. Thus, it becomes possible to control the rotating state (for example, number of revolutions, and rotational speed) of the second roll 13.

In this case, the rotating state (motor output and rotational motion) of the second motor 57 is transmitted to the second roll 13 as it is by the second power transmission mechanism 95 without the rotating state (motor output and rotational motion) being changed (for example, without the rotational speed being reduced). As a result, it is possible to rotate the second roll 13 with the timing identical to the rotating state (motor output and rotational motion) of the second motor 57. It should be noted that, in this description, the identical timing implies high-level concepts such as identical number of revolutions, identical rotational speed, identical angular speed, identical angular acceleration, and the like.

[Third Drive Mechanism 55]

As shown in FIG. 1 through FIG. 3, the third drive mechanism 55 is coupled to the fifth drive shaft part 14*a* of the third roll 14. The third drive mechanism 55 is configured to be able to control the rotating state of the third roll 14. The third drive mechanism 55 includes the third rotating shaft part 66, third motor 58, and a third power transmission mechanism 96.

The third rotating shaft part 66 is arranged at the rotating part of the third motor 58. The rotating part is configured to be able to rotate together with the rotor 59 (see FIG. 11). The rotation center of the third rotating shaft part 66, the rotation center of the rotating part, and the rotation center of the third motor 58 (rotor 59) coincide with each other on the one rotation central axis 67. In such a state, it becomes possible to transmit the rotating state (motor output and rotational motion) of the third motor 58 to the outside through the third rotating shaft part 66 without incurring a loss.

In the third power transmission mechanism 96, an input part is formed on one side thereof in the power transmitting direction, and an output part is formed on the other side thereof in the power transmitting direction. The third power transmission mechanism 96 is arranged between the third motor 58 and the third roll 14. To the one side (input part) of the third power transmission mechanism 96, the third rotating shaft part 66 of the third motor 58 is coupled. To the other side (output part) of the third power transmission mechanism 96, the fifth drive shaft part 14*a* of the third roll 14 is coupled.

The third power transmission mechanism 96 is provided with a rigid coupling 73, flexible coupling 74, and reducer 75. In this case, the arrangement configuration of the third power transmission mechanism 96 is identical to the aforementioned first power transmission mechanism 72. Accordingly, configurations identical to the first power transmission mechanism 72 are denoted by reference symbols identical to the first power transmission mechanism 72, and descriptions of them are omitted.

In such a configuration, the third motor 58 is coupled to the third roll 14 through the third rotating shaft part 66, third power transmission mechanism 96, and fifth drive shaft part 14*a*. Here, the third motor 58 is controlled by the controller (not shown). The rotating state (motor output and rotational motion) of the third motor 58 is transmitted to the fifth drive shaft part 14*a* through the third rotating shaft part 66, and third power transmission mechanism 96. The fifth drive shaft part 14*a* rotates, and the sixth drive shaft part 14*b* rotates at the same time. Thus, it becomes possible to control the rotating state (for example, number of revolutions, and rotational speed) of the third roll 14. In this case, the rotating state (motor output and rotational motion) of the third motor 58 is transmitted to the third roll in a state where the rotational speed is reduced and the torque is increased by the third power transmission mechanism 96 (reducer 75).

Advantages of First Embodiment

According to this embodiment, the second power transmission mechanism 95 provided with the flexible coupling 74 is arranged between the second motor 57 and the second roll 13. That is, the second motor 57 and the second roll 13 are coupled to each other through the second power transmission mechanism 95 provided with the flexible coupling 74. Thereby, when the state where the first roll 12 is pressed against the second roll 13 is changed, the whole of the changed state occurring in the second roll 13 is completely absorbed and removed by the flexible coupling 74.

Here, as the changed state occurring in the second roll 13, the changed state of the rotating shaft of the second roll 13 occurring when the first roll 12 is moved toward or away from the second roll 13, for example, an "angular deviation" such as an eccentricity or a deflection angle of the second rotation central axis 13*r* is assumed. Even when such an angular deviation (eccentricity/deflection angle) has occurred, the flexible coupling 74 (leaf spring unit 85) is elastically deformed according to the degree of the magnitude of the angular deviation (eccentricity/deflection angle). Thereby, the whole of the angular deviation (eccentricity/deflection angle) is completely absorbed and removed. Accordingly, the influence of the state where the first roll 12 is pressed against the second roll 13 on the second roll, i.e., the changed state of the second roll 13 is never transmitted to the second motor 57 (second rotating shaft part 65).

Furthermore, the flexible coupling 74 (leaf spring unit 85) is elastically deformed, whereby the posture of the second motor 57 (rotor 59) or the second rotating shaft part 65, i.e., the posture of the rotation central axis 67 is maintained constant at all times. At the same time, the rotating state (motor output and rotational motion) of the second motor 57 is transmitted to the second roll 13 as it is by the second power transmission mechanism 95 without the rotating state (motor output and rotational motion) being changed (for example, without the rotational speed being reduced). As a result, it is possible to rotate the second roll 13 with the timing identical to the rotating state (motor output and rotational motion) of the second motor 57.

At this time, the torque ripples (pulsation phenomenon) of the second motor 57 are maintained at a level at which gear marks (horizontal stripes) do not occur. As a result, it is possible to previously prevent gear marks (horizontal stripes) from occurring. Thus, it is possible to manufacture (form) a sheet (film) without causing gear marks (horizontal stripes).

Furthermore, according to this embodiment, when viewed from a direction (longitudinal direction) parallel to the first to third rotation central axes 12*r*, 13*r*, and 14*r*, the temperature regulating unit 4 is arranged on one side of the roll unit 3 (first to third rolls 12, 13, and 14), and the drive unit 6 is arranged on the other side of the roll unit 3. Thereby, it is possible to improve the maintainability of both the units 4 and 6. Furthermore, in carrying out maintenance of the piping 4*a*, 4*b*, and 4*c* of the temperature regulating unit 4, for example, even when a liquid or a coolant leaks or drops, the electric circuit or the like of the drive unit 6 is never adversely affected.

Furthermore, according to this embodiment, regarding the second motor 57 directly contributing to the rotation of the second roll 13, the number of poles is set to 8 or more, and the number of slots is set to 15 or more, and more desirably, the number of poles is set to 20 or more, and the number of slots is set to 24 or more. Thereby, it is possible to generate optimum rotational torque within the range of the practical rotational speed (0 to 100 rpm) of the second roll 13. That is, it is possible to realize a second motor 57 capable of generating high torque at a low rotational speed. As a result, it is possible to previously prevent such a situation that formation of a sheet (film) 7c cannot be carried out due to an overload on the second motor 57 from occurring.

[Gear Mark (Horizontal Stripes) Occurrence Test]

Figure 21:
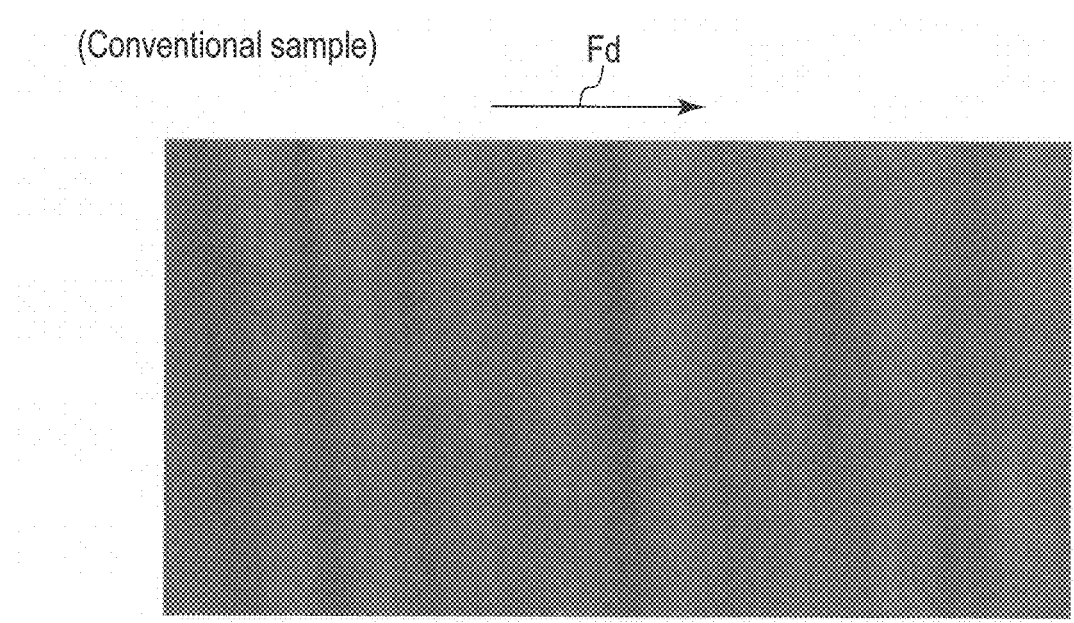
FIG. 21 is an image view of a conventional sample in which gear marks (horizontal stripes) have occurred.
Figure 22:
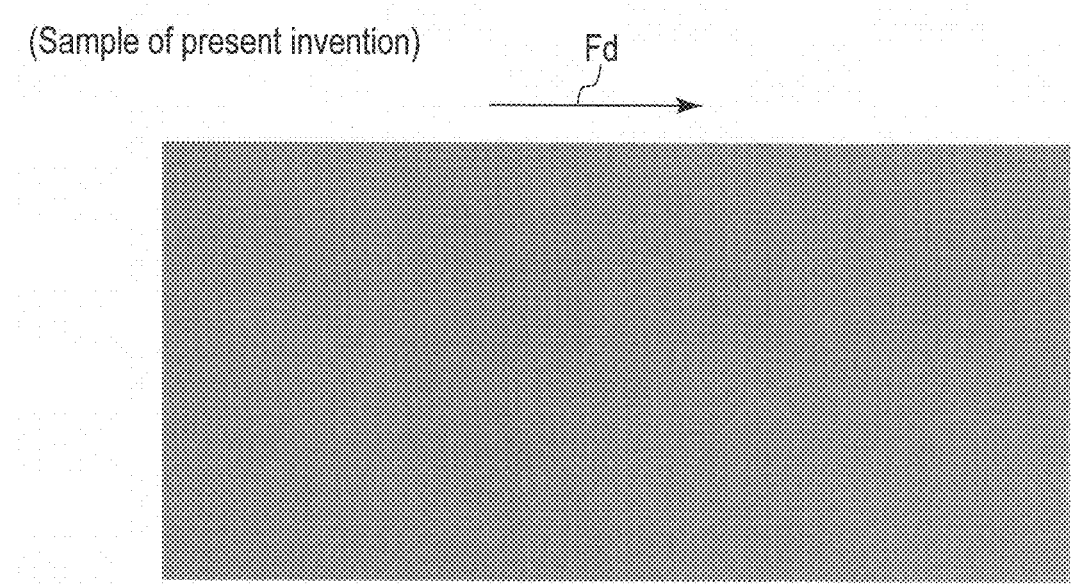
FIG. 22 is an image view of a sample of the present invention in which gear marks (horizontal stripes) are prevented from occurring.

In FIG. 21 and FIG. 22, test results of the sheet/film manufacturing apparatus 1 of this embodiment are shown. In the test, two types of sheet/film manufacturing apparatuses are prepared. Specifications of both the apparatuses are set identical to each other. In this case, a second power transmission mechanism 95 provided with a flexible coupling 74 is applied to the drive unit of one of the apparatuses, and this apparatus is made the apparatus according to the invention as claimed in the application concerned. A power transmission mechanism provided with no flexible coupling is applied to the drive unit of the other apparatus, and this apparatus is made the apparatus according to the prior art. The identical operation timing was set to both the apparatuses, and then the test was carried out.

As is evident from the test results, although in the conventional sample (see FIG. 21), gear marks (horizontal stripes) occurred, in the sample of the invention of the application (see FIG. 22), occurrence of gear marks (horizontal stripes) was prevented. It should be noticed that arrows in the drawings indicate the feed direction Ed of the sheet (film).

Figure 19:
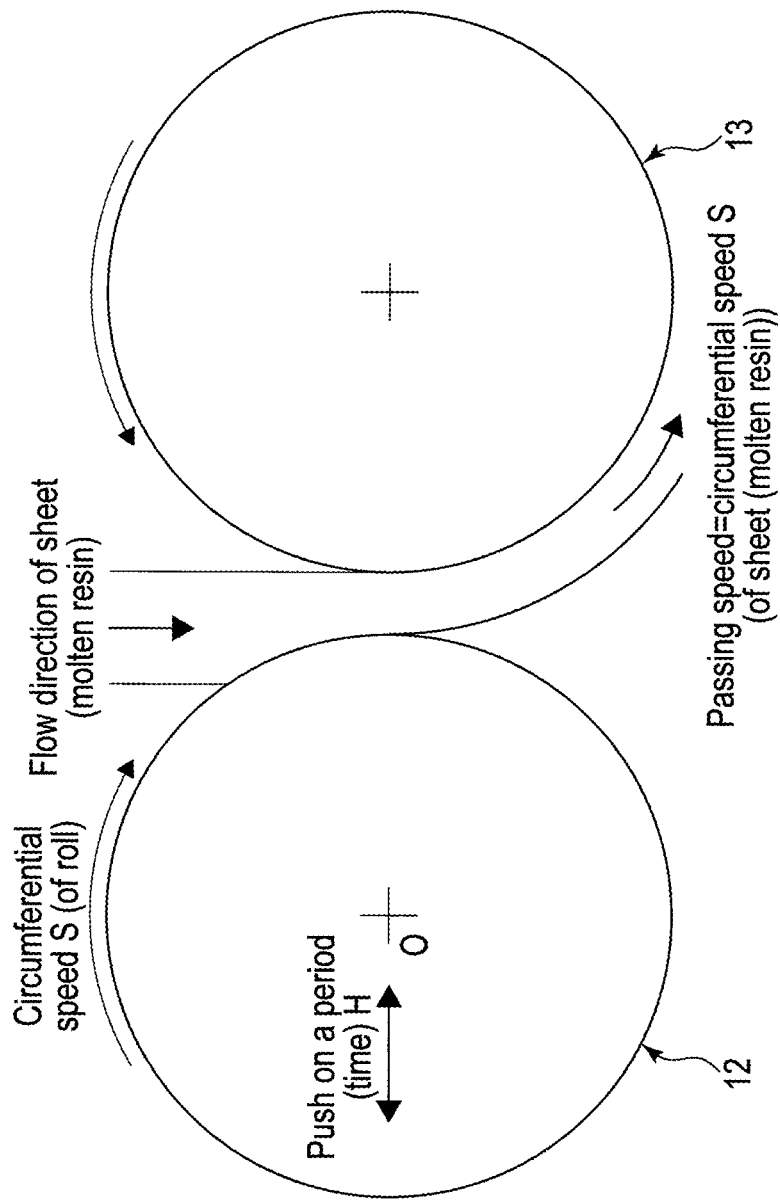
FIG. 19 is a view showing a state where the thickness of the molten resin is varied by making the first roll carry out a reciprocating motion with respect to the second roll at the time of a gear mark (horizontal stripes) occurrence test.

Furthermore, in such an occurrence test, a range of wavelengths T (mm) satisfying the relational expression (M≥π×D/T) to be described later is set. In the setting method, as shown in FIG. 19, the first roll 12 is made to carry out a reciprocating motion with respect to the second roll 13, whereby the thickness of the sheet (film)-like molten resin is varied.

At this time, the pushing period on which the first roll 12 is made to carry out a reciprocating motion is made H, and the speed (circumferential speed) of the molten resin passing through the part between the first roll 12 and the second roll 13 is made S. Then, in the molten resin, a periodic change appears in the flow direction of the molten resin with timing (wavelength, pitch) of P=S×H. That is, a thickness variation occurs in the molten resin with timing (wavelength, pitch) of P=S×H.

Figure 20:
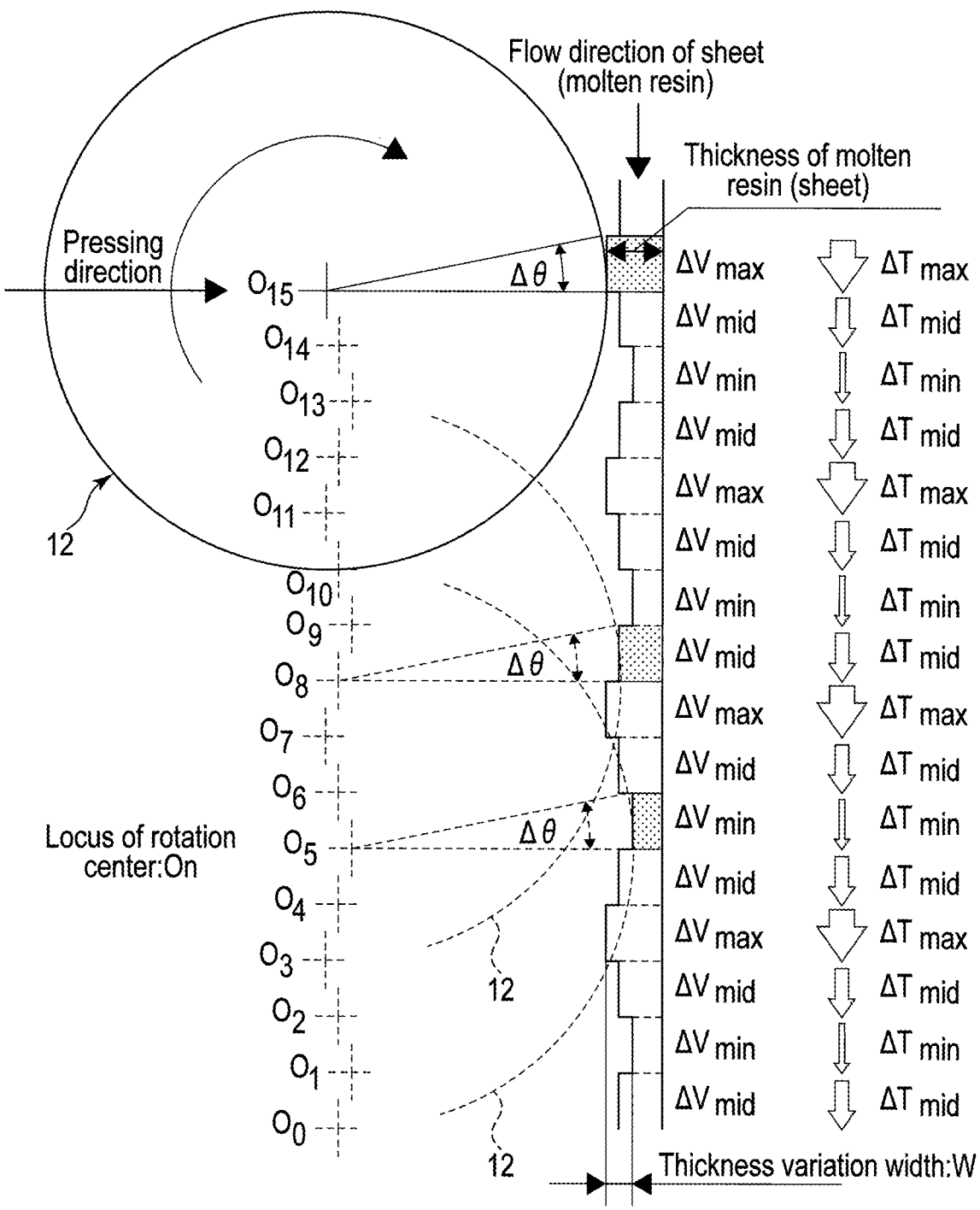
FIG. 20 is a view schematically showing the state where the thickness of the molten resin of FIG. 19 is varied.

In FIG. 20, an occurrence model of the thickness variation occurring in the molten resin is shown. In the occurrence model, a result of a periodic variation of the first roll 12 caused by periodically changing the rotational torque of the first motor 56 between ΔTmax and ΔTmin is shown.

When the rotational torque is high (ΔTmax), the pressing amount or the feed amount of the molten resin per unit rotational angle A becomes larger (ΔVmax). Thereby the thickness of the molten resin increases. The reaction force of the molten resin against the first roll 12 becomes larger. As a result, as is evident from the locus ($O_3$, $O_7$, $O_{11}$, and $O_{15}$) of the rotation center, the first roll 12 slightly retreats (displacement or deformation).

When the rotational torque is low (ΔTmin), the pressing amount or the feed amount of the molten resin per unit rotational angle A becomes smaller (ΔVmin). Thereby the thickness of the molten resin decreases.

The reaction force of the molten resin against the first roll 12 becomes smaller. As a result, as is evident from the locus ($O_1$, $O_5$, $O_9$, and $O_{13}$) of the rotation center, the first roll 12 slightly advances (displacement or deformation).

The inventors of the present invention has earnestly carried out research on the timing (wavelength, pitch) (i.e., P=S×H) of the thickness variation of the molten resin. Here, for example, while the first roll 12 makes one rotation, a thickness variation was made to occur in the flow direction of the molten resin with timing (wavelength, pitch) of P (=S×H)≤5 mm. At this time, the width of the thickness variation is 0.3 μm or less. Such a thickness variation is absorbed and removed by the viscoelastic characteristics of the molten resin. As a result, it has been confirmed that it is possible to manufacture (form) a sheet (film) without causing gear marks (horizontal stripes).

Furthermore, as a result of earnest research carried out by the inventors of the present invention, it has been confirmed that when a thickness variation is made to occur with timing (wavelength, pitch) of P (=S×H)≤3 mm, gear marks (horizontal stripes) are prevented from occurring more effectively.

Such a thickness variation coincides with the occurrence timing of the short-period oscillation resulting from a cogging phenomenon of the second motor 57. Further, such a short-period oscillation occurs with the identical timing along the outer circumferential surface of the second roll rotating with the timing identical to the second motor. Then, the range of the wavelengths T (mm) to be described later can be specified as the oscillation occurrence timing satisfying the relationship of P≤5 mm (desirably 3 mm), i.e., as a distance between two points identical to each other in phase.

It should be noticed that when the range of the wavelengths T (mm) to be described later is P>5 mm, a "thickness variation" which is not absorbed by the viscoelastic characteristics of the molten resin occurs. For example, when P=13 mm, the width of the thickness variation becomes 10 μm. In this case, occurrence of gear marks (horizontal stripes) cannot be prevented and, as a result, gear marks remain on the manufactured (formed) sheet (film).

[Specification of Second Motor 57 Based on Characteristics of Molten Resin]

After the startup of the sheet/film manufacturing apparatus, and at the previous step before manufacturing (forming) of a completed product, there is sometimes a case where gear marks (horizontal stripes) occur on the surface of the sheet (film) 7c (see FIG. 1). At this time, even when, for example, the forming conditions or operation conditions are adjusted, occurrence of the gear marks (horizontal stripes) cannot be prevented from occurring.

In this case, according to the earnest technical research carried out by the inventors of the present invention, when a variation has been given to the molten resin fed along the roll unit 3 with a specific period, it has been made clear that regarding the pitch of the thickness variation occurring on the sheet (film), in other words, a short-period oscillation having a wavelength of 5 mm or less on the sheet (film), the variation is absorbed by the viscoelastic characteristics of the molten resin, and the influence of the variation of the molten resin does not appear.

Thereby, it can be seen that when the number of times of short-period oscillations occurring while the roll makes one rotation is equal to or greater than a value obtained by dividing the outer circumferential length by the wavelength 5 mm, the short-period oscillations have no influence on the molten resin.

The cogging phenomena occur the number of times corresponding to the least common multiple of the number of poles and the number of slots while the motor (rotor) makes one rotation.

Thus, letting the least common multiple of the number of poles and the number of slots of the second motor 57 be M, the diameter of the second roll 13 be D (mm), and the aforementioned wavelength be T (mm), the following relational expression is established.

$$M = \pi \times D/T \text{ (}\pi\text{: circular constant)}$$

As described above, it has turned out that with respect to the short-period oscillations having a wavelength of 5 mm or less (T≤5) on the sheet (film), the variation is absorbed by the viscoelastic characteristics of the molten resin, and no influence of the variation of the molten resin appears. Thus the least common multiple M of the number of poles and the number of slots of the second motor 57 is configured to satisfy the following relational expression.

$$M \geq \pi \times D/T \ (T=5)$$

That is, $M \geq \pi \times D/5$

Thereby, torque ripples (pulsation phenomenon) based on the cogging phenomena are absorbed by the viscoelastic characteristics of the molten resin. As a result, it is possible to manufacture (form) a sheet (film) without causing gear marks (horizontal stripes).

[Sheet/Film Manufacturing Apparatus 1 According to Second Embodiment (FIG. 4 through FIG. 6)]

In the second motor 57 of the drive unit 6 (second drive mechanism 54), in order to make the second motor 57 generate high torque at a low rotational speed, the number of poles is increased. With the increase in the number of poles, the external dimensions of the second motor become larger. At this time, depending on the degree of the increase in the number of poles, the external dimensions of the second motor 57 becomes larger than the diameter of the second roll 13 in some cases. Then, it becomes difficult to arrange the second motor 57 between the first motor 56 and the third motor 58.

More specifically, for example, when the first roll 12 is pressed against the second roll 13 in order to carry out thickness adjustment of the formed product or disturbance correction, the first motor 56 is moved toward the second motor 57 following the first roll 12. At this time, depending on the degree of the diameter of the second roll 13 or on the degree of the external dimensions of the second motor 57, the first motor 56 comes into contact with the second motor 57. Then, it becomes impossible to carry out thickness adjustment of the formed product or disturbance correction. As a result, it becomes impossible to maintain the quality of the sheet (film) as the completed product constant.

As the measure to solve such a problem, for example, it is advisable to arrange the second motor 57 at a position separate from the first motor 56. As an example of such an arrangement method, a first method of making the space between the first motor 56 and the first roll 12 smaller than the space between the second motor 57 and the second roll 13, or a second method of making the space between the second motor 57 and the second roll 13 larger than the space between the first motor 56 and the first roll 12 can be assumed.

Further, as described above, the first bearing mechanism 15, the third bearing mechanism 17, and the fifth bearing mechanism 19 are linearly lined up in a direction perpendicular to the first to third rotation central axes 12r, 13r, and 14r. Thus, on the basis of the bearing mechanisms 15, 17, and 19, the aforementioned arrangement method is considered.

For example, it is possible to assume a first method of making the space between the first motor 56 and the first bearing mechanism 15 smaller than the space between the second motor 57 and the third bearing mechanism 17, or a second method of making the space between the second motor 57 and the third bearing mechanism 17 larger than the space between the first motor 56 and the first bearing mechanism 15.

Figure 4:
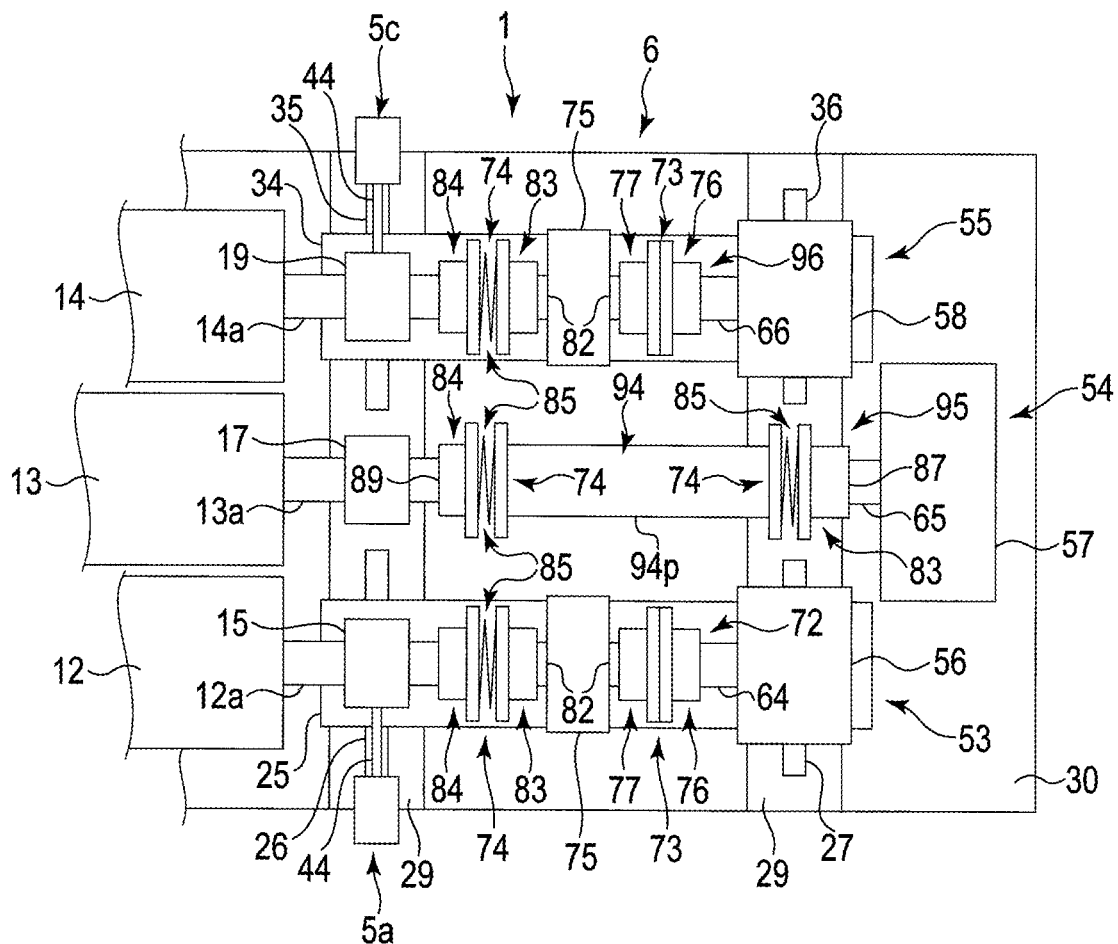
FIG. 4 is a plan view of a sheet/film manufacturing apparatus according to a second embodiment.

In FIG. 4, as an example, an arrangement associated with the first method described above is shown. That is, the space between the first motor 56 and the first roll 12 (first bearing mechanism 15) is set smaller than the space between the second motor 57 and the second roll 13 (third bearing mechanism 17). It should be noted that the space between the first motor 56 and the first roll 12 (first bearing mechanism 15), and the space between the third motor 58 and the third roll 14 (fifth bearing mechanism 19) are set to spaces identical to each other. Further, the first and third power transmission mechanisms 72 and 96 which are respectively arranged between the first and third motors 56 and 58, and the first and third rolls 12 and 14 are identical to the first embodiment (see FIG. 2 and FIG. 3), and hence the configurations identical to the first embodiment are denoted by reference symbols identical to the first embodiment, and descriptions of them are omitted.

Here, between the second motor 57 and the second roll 13 (third bearing mechanism 17), the second power transmission mechanism 95 is arranged. The second power transmission mechanism 95 is provided with two flexible couplings 74, and spacer 94 (intermediate shaft part). The total length of the spacer 94 is set according to the distance between the second motor 57 and the second roll 13 (third bearing mechanism 17). For example, by adjusting length of the intermediate part 94p of the spacer 94 to be described later, it is possible to arrange the second power transmission mechanism 95 between the second motor 57 and the second roll 13 (third bearing mechanism 17) with high accuracy.

As shown in FIG. 15, the spacer 94 includes a cylindrical intermediate part 94p, disk-like first flange part 97, and disk-like second flange part 98. The first flange part 97 is formed concentrically integral with one end of the intermediate part 94p. The second flange part 98 is formed concentrically integral with the other end of the intermediate part 94p. The first flange part 97 and the second flange part 98 are arranged in parallel with each other and in opposition to each other.

Furthermore, the first flange part 97 and the second flange part 98 have shapes and sizes identical to each other. In this case, the first and second flange parts 97 and 98 of the spacer 94, and the first and second flange parts 86 and 88 of the first and second flexible couplings 74 have shapes and sizes identical to each other.

The two flexible couplings 74 are respectively provided on both sides of the spacer 94. Between the spacer 94 (first flange part 97) and the second motor (first rotating shaft part 65), the first flexible coupling 74 (one of the two flexible couplings 74) is arranged. Between the spacer 94 (second flange part 98) and the second roll 13 (third drive shaft part 13a), the second flexible coupling 74 (the other of the two flexible couplings 74) is arranged.

The first flexible coupling 74 (one of the two flexible couplings 74) is configured by being provided with the aforementioned leaf spring unit 85 between the aforementioned first hub flange 83 and the aforementioned spacer 94 (first flange part 97). In this case, the leaf spring unit 85 is arranged between the first flange part 86 of the first hub flange 83 and the first flange part 97 of the spacer 94. The flange parts 86 and 97 are fixed to each other by means of a plurality of bolts 91 and the like. Thus, one of the flexible couplings 74 can be configured.

The second flexible coupling (the other of the two flexible couplings 74) is configured by being provided with the aforementioned leaf spring unit 85 between the aforementioned second hub flange 84 and the aforementioned spacer 94 (second flange part 98). In this case, the leaf spring unit 85 is arranged between the second flange part 88 of the second hub flange 84 and the second flange part 98 of the spacer 94. The flange parts 88 and 98 are fixed to each other by means of a plurality of bolts 91 and the like. Thus, the second flexible coupling 74 (the other of the two flexible couplings 74) can be configured.

Here, in FIG. 15, as an example, the intermediate shaft part (spacer) 94 is constituted of one integrated shaft member (i.e., intermediate part 94p). However, the configuration of such an intermediate shaft part (spacer) 94 is not limited to the above. For example, one intermediate shaft part (spacer) 94 may be constituted of a member formed by coupling a plurality of shaft members (intermediate parts 94p) to each other.

More specifically, a plurality of shaft members (intermediate parts 94p) are prepared, and these shaft members (intermediate parts 94p) are flexibly coupled to each other by the first flexible coupling 74. Thus, it is possible to configure one intermediate shaft part (spacer) 94 in which a plurality of shaft members (intermediate parts 94p) are coupled to each other.

According to such a configuration, the changed state of the rotating shaft of the second roll 13 occurring when the first roll 12 is moved toward or away from the second roll 13, for example, an "angular deviation" such as an eccentricity or a deflection angle of the second rotation central axis 13r is absorbed and removed by the intermediate shaft part (spacer) 94 or the intermediate part 94p being inclined with the one shaft coupling (shaft coupling 74 closer to the second motor 57) used as a base point. Thereby, the posture of the rotating shaft (rotation center) of the second motor 57 is maintained constant at all times.

Figure 5:
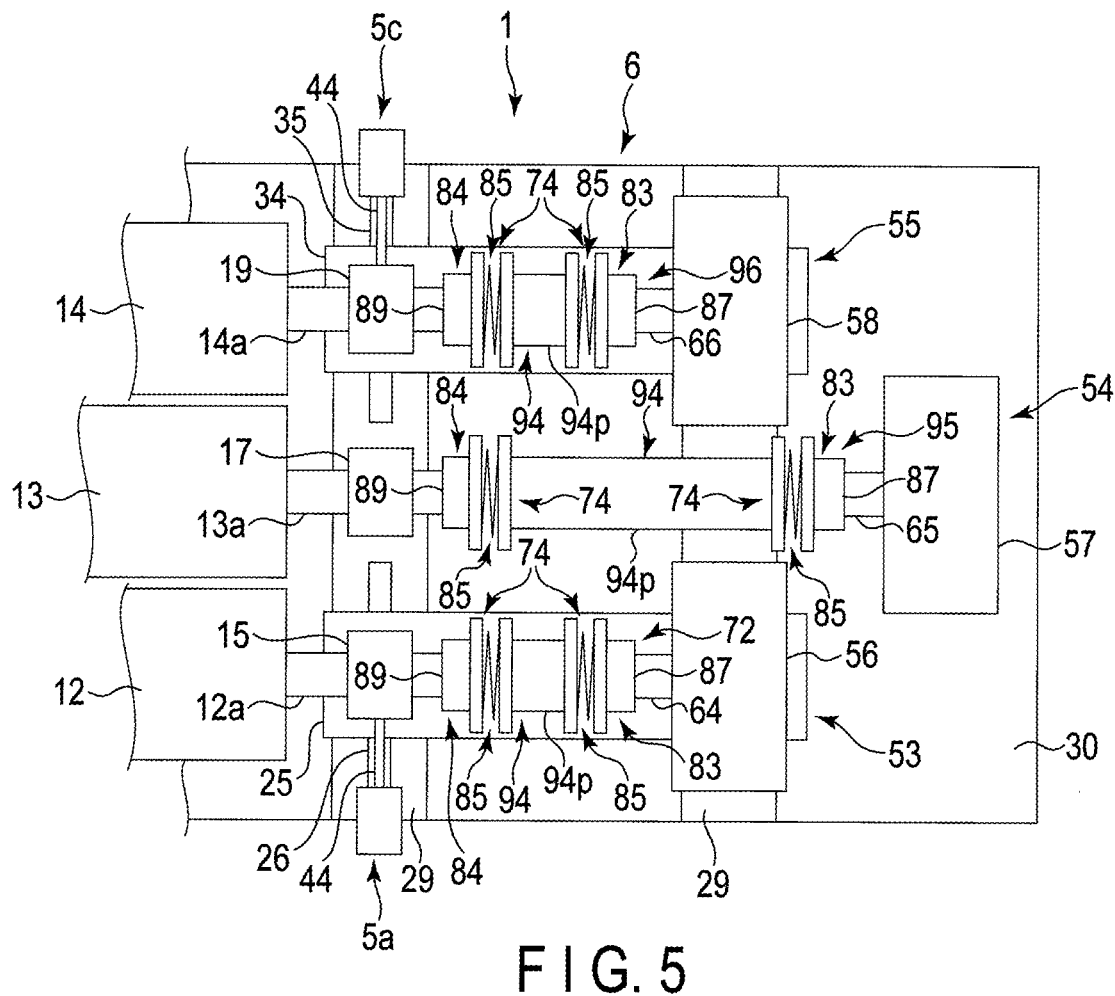
FIG. 5 is a plan view of a sheet/film manufacturing apparatus according to another configuration of the second embodiment.
Figure 6:
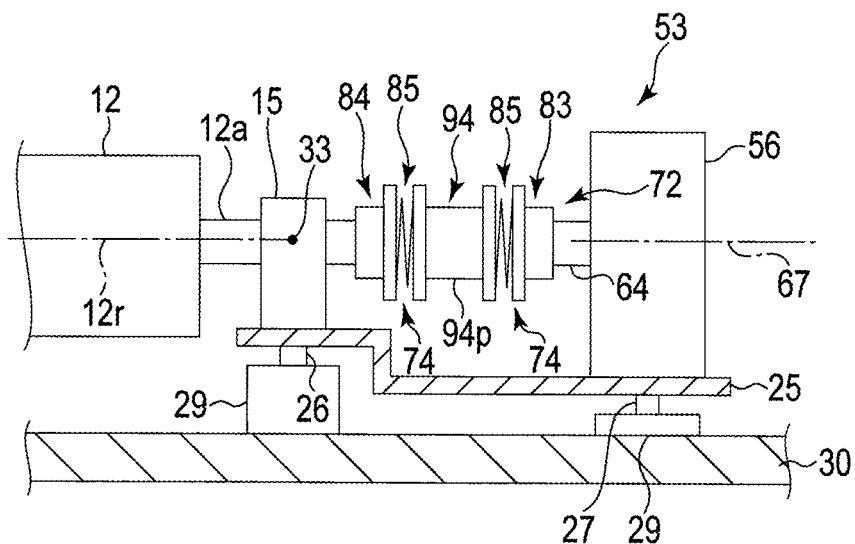
FIG. 6 is a side view showing the configurations of the first and third power transmission mechanisms of FIG. 5.

It should be noted that in FIG. 5 and FIG. 6, a sheet/film manufacturing apparatus 1 according to another configuration of the aforementioned second embodiment is shown. The first and third power transmission mechanisms 72 and 96 have configurations identical to the aforementioned second power transmission mechanism 95. The first and third power transmission mechanisms 72 and 96 are configured by making the length of the spacer 94 (intermediate part 94p) of the second power transmission mechanism 95 short. According to such a configuration, it is possible to manufacture (form) a sheet (film) more securely without causing gear marks (horizontal stripes).

Advantages of Second Embodiment

As the space between the first motor 56 and the first roll 12 (first bearing mechanism 15) becomes longer, not only the torsional rigidity is made lower, but also the weight (mass) is made heavier correspondingly to the elongated amount of space.
Then, as described previously, there is a possibility of the responsibility or the followability of the first roll 12 being lowered.

However, as described in this embodiment, the space between the first motor 56 and the first roll 12 (first bearing mechanism 15) is set smaller than the space between the second motor 57 and the second roll 13 (third bearing mechanism 17). Then, it is possible to maintain or improve the torsional rigidity, and reduce the weight (mass) correspondingly to the shortened amount of space.

Thereby, it is possible to improve the responsibility or the followability of the first roll 12 or maintain the responsibility or the followability thereof constant. As a result, it is possible to maintain the quality of the sheet (film) as the completed product constant. It should be noted that other advantages are identical to the advantages of the aforementioned first embodiment, and hence descriptions of them are omitted.

[Sheet/Film Manufacturing Apparatus 1 According to Third Embodiment (FIG. 16 and FIG. 17)]

This embodiment is an improvement of the aforementioned second embodiment (FIG. 4 through FIG. 6). As the first and third power transmission mechanisms 72 and 96, commercially available link-type couplings 99 (Schmidt couplings) are applied. Although such a coupling 99 is applicable to any of the first to third power transmission mechanisms 72, 95, and 96, hereinafter a case where the couplings 99 are applied to the first and third power transmission mechanisms 72 and 96 will be described.

Figure 16:
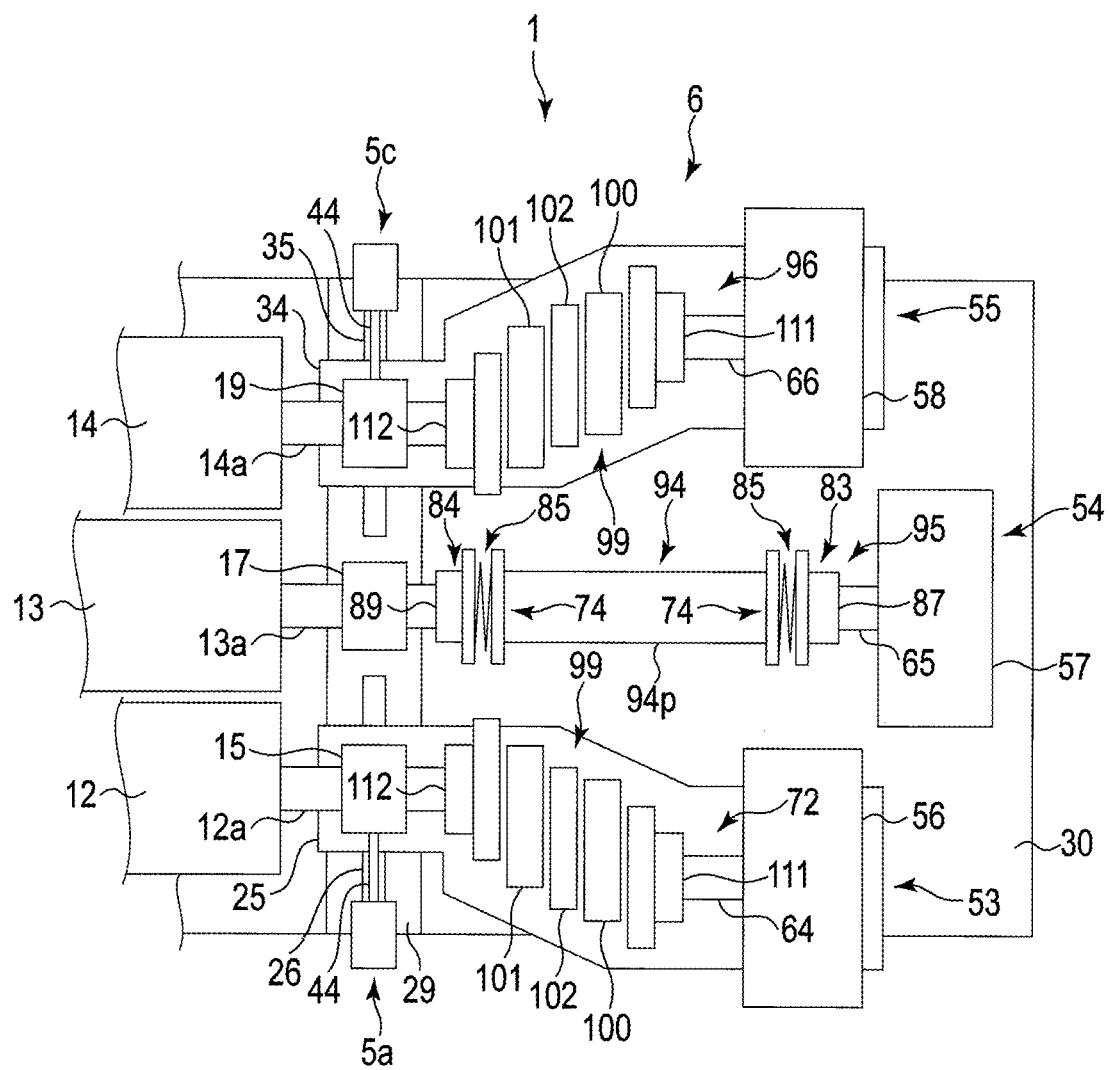
FIG. 16 is a plan view of a sheet/film manufacturing apparatus according to a third embodiment.
Figure 17:
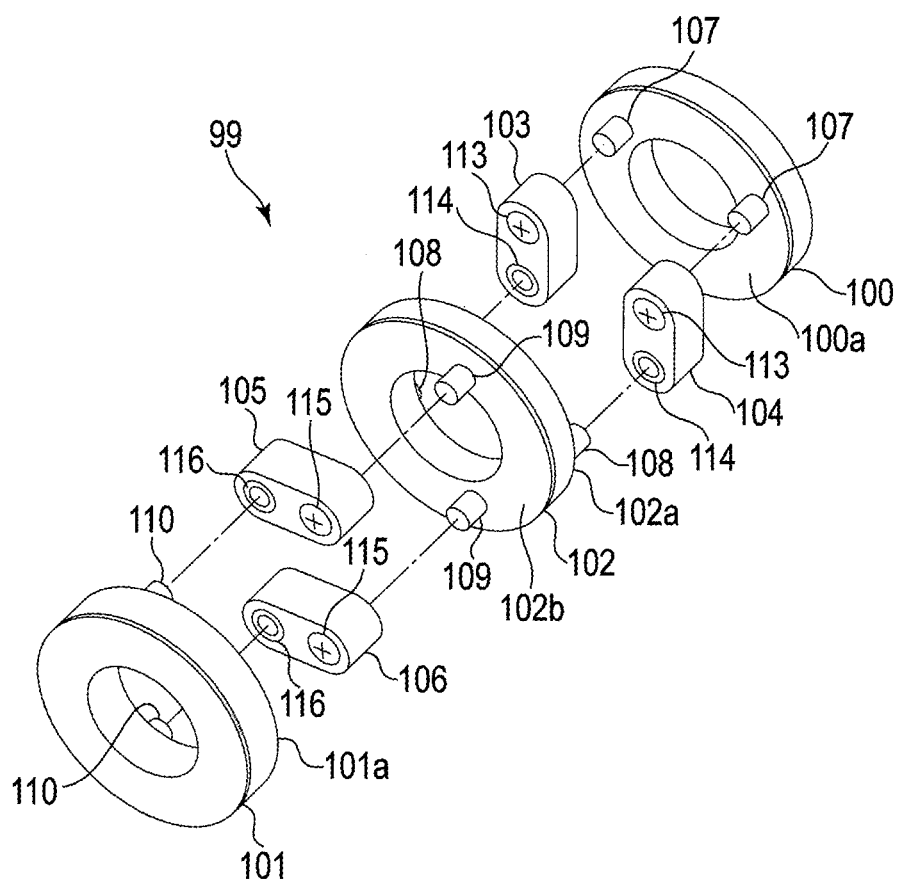
FIG. 17 is a perspective view showing the configuration of the first and third power transmission mechanism of FIG. 16.

As shown in FIG. 16 and FIG. 17, the couplings 99 applied to the first and third power transmission mechanisms 72 and 96 have configurations identical to each other. The coupling 99 includes a first disk 100, second disk 101, intermediate disk 102, and link mechanisms (first to fourth links 103 to 106, first to fourth pins 107 to 110). The coupling 99 is arranged/configured between a first coupling part 111 and a second coupling part 112.

The coupling parts 111, and 112 on both sides of the first power transmission mechanism 72 are respectively attached to the first rotating shaft part 64 of the first motor 56 and the first drive shaft part 12a of the first roll 12. That is, the first disk 100 is coupled to the first rotating shaft part 64 through the coupling part 111. Furthermore, the second disk 101 is coupled to the first drive shaft part 12a through the coupling part 112.

The coupling parts 111, and 112 on both sides of the third power transmission mechanism 96 are respectively attached to the third rotating shaft part 66 of the third motor 58 and the fifth drive shaft part 14a of the third roll 14. That is, the first disk 100 is coupled to the third rotating shaft part 66 through the coupling part 111. Furthermore, the second disk 101 is coupled to the fifth drive shaft part 14a through the coupling part 112.

The first disk 100, second disk 101, and intermediate disk 102 have shapes and sizes identical to each other. The first disk 100, the second disk 101, and the intermediate disk 102 have a hollow disk-like shape. The first disk 100, the second disk 101, and the intermediate disk 102 are arranged in parallel with each other and in opposition to each other. The intermediate disk 102 is arranged between the first disk 100 and the second disk 101.

On both sides of the intermediate disk 102, first and second intermediate surfaces 102a and 102b opposed to each other in parallel with each other are configured. The first disk 100 is arranged in opposition to the first intermediate surface 102a of the intermediate disk 102. The first disk 100 has a first surface 100a opposed to the first intermediate surface 102a in parallel with each other.

A link mechanism is configured between the first surface 100a and the first intermediate surface 102a. That is, on the first surface 100a, two first pins 107 are provided. The two first pins 107 protrude toward the first intermediate surface 102a in parallel with each other. On the first intermediate surface 102a, two second pins 108 are provided. The two second pins 108 protrude toward the first surface 100a in parallel with each other.

The first pins 107 and the second pins 108 are coupled to each other through first and second links 103 and 104. In each of the first and second links 103 and 104, two coupling holes 113 and 114 are formed. In the coupling holes 113 and 114, bearings (not shown) are accommodated. In each of the first and second links 103 and 104, the first pin 107 is rotatably coupled to the one coupling hole 113. The second pin 108 is rotatably coupled to the other coupling hole 114.

On the other hand, the second disk 101 is arranged in opposition to the second intermediate surface 102b of the intermediate disk 102. The second disk 101 has a second surface 101a opposed to the second intermediate surface 102b in parallel with each other.

A link mechanism is configured between the second surface 101a and the second intermediate surface 102b. That is, on the second intermediate surface 102b, two third pins 109 are provided. The two third pins 109 protrude toward the second surface 101a in parallel with each other. On the second surface 101a, two fourth pins 110 are provided. The two fourth pins 110 protrude toward the second intermediate surface 102b in parallel with each other.

The third pins 109 and the fourth pins 110 are coupled to each other through the third and fourth links 105 and 106. In each of the third and fourth links, two coupling holes 115 and 116 are formed. In the coupling holes 115 and 116, bearings (not shown) are accommodated. In each of the third and fourth links 105 and 106, the third pin 109 is rotatably coupled to the one coupling hole 115. The fourth pin 110 is rotatably coupled to the other coupling hole 116.

It should be noted that when the aforementioned coupling 99 is applied to the second power transmission mechanism 95, the first disk 100 is coupled to the second rotating shaft part 65 through a coupling part 111, and the second disk 101 is coupled to the third drive shaft part 13a through a coupling part 112. It is needless to say that, thereby, advantages identical to the first embodiment can be obtained.

Advantages of Third Embodiment

According to this embodiment, the rotating states (motor output and rotational motion) of the first and third motors 56 and 58 are transmitted from the first and third rotating shaft parts 64 and 66 to the first disks 100 through the coupling parts 111. At this time, the rotational motion of the first disks 100 is transmitted from the first and second links 103 and 104 to the intermediate disks 102, and is thereafter transmitted from the third and fourth links 105 and 106 to the second disks 101. At this time, the rotational motion of the second disks 101 is transmitted from the coupling parts 112 to the first and third rolls 12 and 14 through the first and fifth drive shaft parts 12a and 14a. Thus, it is possible to rotate the first and third rolls 12 and 14 with the timing identical to the rotating states (motor output and rotational motion) of the first and third motors 56 and 58.

Furthermore, the changed state of the second roll 13 occurring when the first roll 12 is moved toward or away from the second roll 13 is absorbed and removed by the aforementioned link mechanisms. Thereby, it is possible to maintain the postures of the first and third rotating shaft parts 64 and 66 constant at all times. It should be noted that other configurations are identical to the second embodiment, and hence configurations identical to the second embodiment are denoted by reference symbols identical to the second embodiment, and descriptions of them are omitted. Furthermore, the advantages other than the above are identical to the aforementioned first and second embodiments, and hence descriptions of them are omitted.

Figure 18:
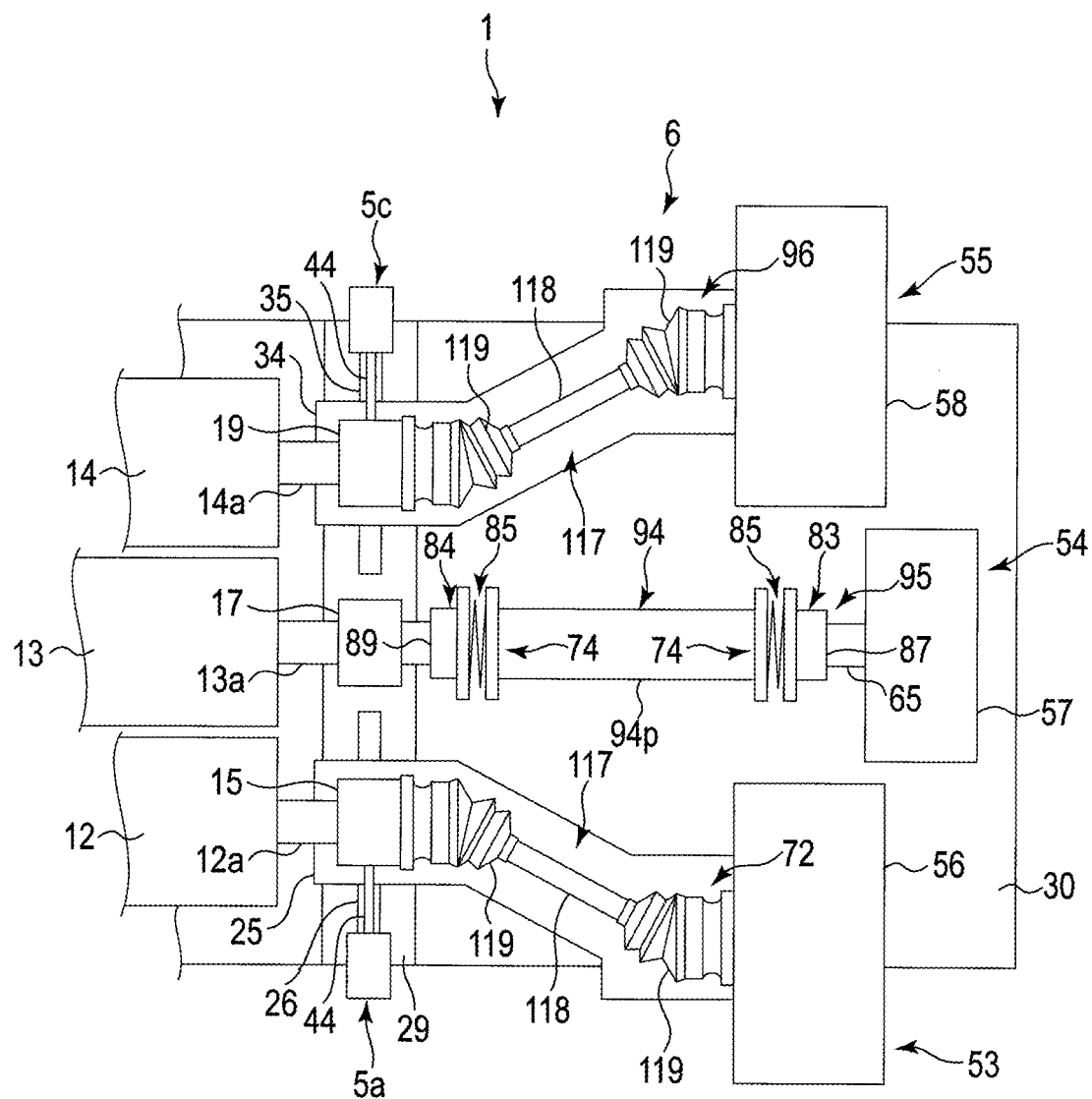
FIG. 18 is a plan view of a sheet/film manufacturing apparatus according to a fourth embodiment.

[Sheet/Film Manufacturing Apparatus 1 According to Fourth Embodiment (FIG. 18)]

This embodiment is an improvement of the aforementioned second embodiment (FIG. 4 through FIG. 6). As the first and third power transmission mechanisms 72 and 96, commercially available ball joints 117 are applied. A ball joint 117 is configured by being provided with joint mechanisms (not shown) covered with rubber boots 119 on both sides of a shaft 118. The joint mechanism is, although not particularly shown, provided with a socket on which a spherical sliding surface is formed, and metallic ball rotatable along the socket (sliding surface). Further, to the metallic balls, the first and third rotating shaft parts 64 and 66 of the first and third motors 56 and 58, and the first drive shaft part 12a and fifth drive shaft part 14a of the first and third rolls 12 and 14 are coupled.

Advantages of Fourth Embodiment

According to this embodiment, the metallic balls rotate and turn along the sockets (sliding surfaces), whereby it is possible to rotate the first and third rolls 12 and 14 with the timing identical to the rotating states (motor output and rotational motion) of the first and third motors 56 and 58. It should be noted that other configurations are identical to the second embodiment, and hence configurations identical to the second embodiment are denoted by reference symbols identical to the second embodiment, and descriptions of them are omitted. Furthermore, the advantages of this embodiment are identical to the aforementioned first and second embodiments, and hence descriptions of them are omitted.

It should be noted that, here, as an example, although a specification in which ball joints 117 are applied as the shaft couplings of the first and third power transmission mechanisms 72 and 96 has been described, the specification is not limited to the above, and such a ball joint 117 may be applied as the shaft coupling of the aforementioned second power transmission mechanism 95. For example, in the aforementioned embodiment associated with FIG. 2, although the flexible coupling 74 is applied as the shaft coupling of the second power transmission mechanism 95, in place of the flexible coupling 74, the ball joint 117 is applied.

[Sheet/Film Manufacturing Apparatus 1 According to Fifth Embodiment (FIG. 23 through FIG. 27)]

FIG. 23 to FIG. 27 each show a concrete structure of a sheet/film manufacturing apparatus 1 (sheet/film forming roll apparatus) according to modifications of the first to fourth embodiments described above. Note here that the first and second rolls 12 and 13 according to the first to fourth embodiments comprise cylindrical and mirror-finished first and second transcription surfaces 12s and 13s, whereas in this embodiment, preset patterns P1 and P2 (see FIG. 26) are formed on cylindrical first and second transcription surfaces 12s and 13s of the first and second rolls 12 and 13.

As the patterns P1 and P2, for example, a regular specification in which a pattern layout is regularly repeated along the shaft direction and an irregular specification in which a pattern layout is repeated irregularly along the shaft direction are considered. Furthermore, an entire specification in which the pattern layout is formed on over the entire roll surface and a local specification in which the pattern layout is formed only on a section of the roll surface are considered. In addition, a single-type specification in which the pattern layout is formed by one type of uneven shape (outline) and a multi-type specification in which the pattern layout is formed by a plurality of types of uneven shapes (outline) are considered.

Here, a specification of combination of various specifications described above can be considered, which is, for example, a specification comprising such a surface configuration (outline) that a recess (or projection) is laid out on a section of a roll surface while the other section is flat.

In this embodiment, a direction along the first rotation central axis 12r is defined as a shaft direction 12r, a direction along the second rotation central axis 13r is defined as a shaft direction 13r and a direction along a third rotation central axis 14r is defined as a shaft direction 14r.

The drawings show an example in which a first pattern P1 is formed on the first transcription surface 12s of the first roll 12 by continuously arranging a plurality of circumferentially continuous circular grooves 12g along the shaft direction 12r. Each circular groove 12g is formed by recessing of the first transcription surface 12s circularly along its circumferential direction. In other words, a plurality of projections 12t projecting in a tapered manner towards the radial direction perpendicular to the shaft direction are formed on the first transcription surface 12s.

On the other hand, a second pattern P2 is formed on the second transcription surface 13s of the second roll 13 by intermittently arranging a plurality of circumferentially continuous rectangular grooves 13g along the shaft direction 13r. Each rectangular groove 13g is formed by recessing of the second transcription surface 13s rectangularly along its circumferential direction. The rectangular grooves 13g are formed so that the pitch thereof along the shaft direction 13r coincides with the pitch of the projection 12t along the shaft direction 12r.

In the initial setting of the apparatus, the positions of the first roll 12 and the second roll 13 along the shaft directions 12r and 13r are adjusted. Here, at the contact point G1 between the first roll 12 and the second roll 13, the projections 12t and the rectangular grooves 13g oppose respectively one by one with each other. In this state, the first and second rolls 12 and 13 are rotated. Thus, on the molten resin 7a continuously fed out from the discharge unit 2, the first patterns P1 and the second patterns P2 are transcribed onto respective surfaces while passing the contact point G1.

Figure 26:
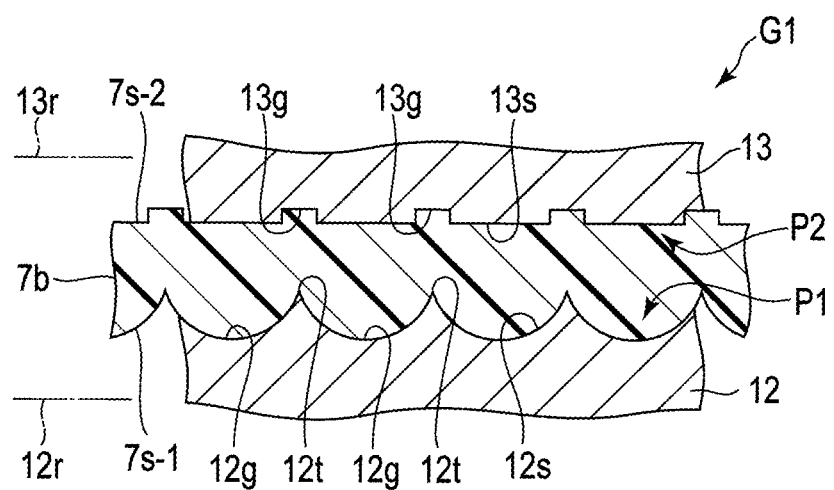
FIG. 26 is a partially expanded cross sectional view showing the structure of a contact point between a first roll and a second roll.
Figure 27:
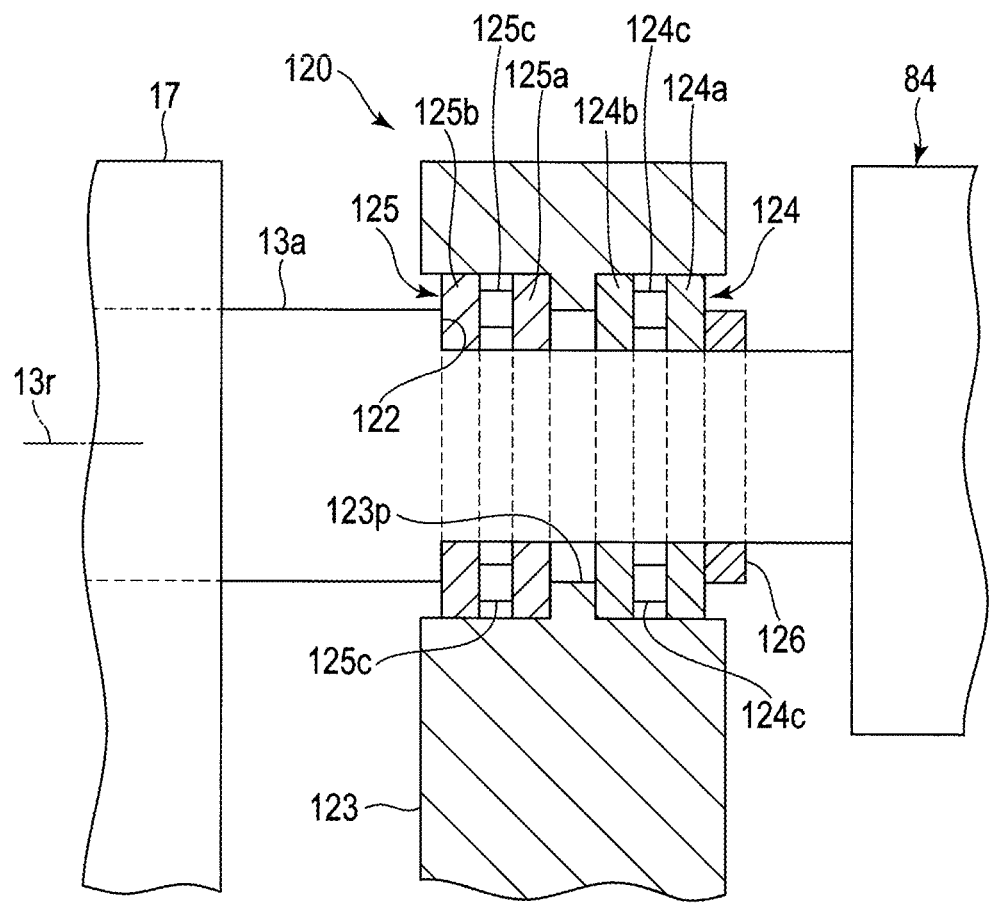
FIG. 27 is a cross sectional view showing the structure of a thrust-bearing mechanism supporting along the shaft direction.

FIG. 26 shows, as an example, a partial cross section of the molten resin 7b at the time of passing the contact point G1. The first patterns P1 is transcribed on a surface 7s-1 of the molten resin 7b and the second patterns P2 is transcribed on a rear surface 7s-2. At this time, no displacement is created between these patterns P1 and P2 on respective surfaces of the sheet (film) with relative to each other.

On the other hand, in some cases, the roll 12 and both 13 may be shifted relatively to the shaft directions 12r and 13r while the apparatus being driven. In this case, the shifting appears as displacement between the patterns P1 and P2 on the respective surfaces of the sheet (film). Here, if the amount of the displacement between the patterns P1 and P2 exceeds a certain degree, a sheet (film) of a predetermined quality cannot be manufactured (formed).

Under these circumstances, the sheet/film forming roll apparatus of this embodiment is configured to be able to adjust the positions of the two rolls 12 and 13 (the patterns P1 and P2) along the shaft directions 12r and 13r, respectively. The timing for adjusting the positions of the shaft directions 12r and 13r is assumed to be, for example, at the initial setting of the apparatus (that is, before the start of transcription of patterns P1 and P2) or during the driving of the apparatus (that is, while transcribing the patterns P1 and P2).

The sheet/film forming roll apparatus comprises a shaft direction supporting mechanism 120 and an axial position adjusting mechanism 121 in addition to the structure of each of the first to fourth embodiments. The shaft direction supporting mechanism 120 is configured to be able to support the second roll 13 along the shaft direction (the direction along the second rotation central axis 13r) while the second roll 13 being rotatable. The axial position adjusting mechanism 121 moves the second roll 13 in the shaft direction 13r along the first roll 12 by moving the shaft direction supporting mechanism 120 in the shaft direction 13r. A concrete description thereof will now be provided.

[Shaft Direction Supporting Mechanism 120]

As shown in FIG. 23 to FIG. 25 and FIG. 27, the shaft direction supporting mechanism 120 is configured to be able to support of the bearing parts (a third drive-shaft part 13a and a fourth drive-shaft part 13b) of the second roll 13. In an example shown in the drawing, the third drive-shaft part 13a is supported rotatably by the shaft direction supporting mechanism 120 so as not to shift in the shaft direction 13r. Furthermore, as the shaft direction supporting mechanism 120, for example, a thrust-bearing unit or an angular bearing unit can be assumed. In an example shown in the drawing, a thrust-bearing unit (see FIG. 27) is applied as the shaft direction supporting mechanism 120.

The thrust-bearing unit (shaft direction supporting mechanism) 120 comprises an annular stepped portion 122, a bearing case 123, two thrust bearings (a first thrust bearing 124 and a second thrust bearing 125) and a fastening tool 126. The annular stepped portion 122 refers to an annually remaining portion in the state where a portion of the third drive-shaft part 13a is reduced in diameter. This portion (the annular stepped section 122) is configured to be able to contact, for example, a fourth bearing washer 125b of the second thrust bearing 125, which will be described later, when the third drive-shaft part 13a is inserted to the thrust-bearing unit 120 along the shaft directions 13r.

The bearing housing 123 is configured to be movable in the shaft directions 13r by the axial position adjusting mechanism 121 (adjusting plate 127), which will be described later. The bearing housing 123 comprises a hollow annular stopper 123p at a central portion thereof. The stopper 123p is configured to allow the third drive-shaft part 13a of the second roll 13 to pass therethrough.

The bearing housing 123 is configured so that the first thrust bearing 124 can be disposed on one side of the stopper 123p along the shaft direction 13r. The bearing housing 123 is configured so that the second thrust bearing 125 can be disposed on the other side of the stopper 123p along the shaft direction 13r. The first and second thrust bearings 124 and 125 are located to oppose parallel to each other in the state where the first and second thrust bearings 124 and 125 are arranged at both sides of the stopper 125p, respectively.

The first thrust bearing 124 comprises a pair of bearing washers (a first bearing washer 124a and a second bearing washer 124b) disposed to oppose each other, and a plurality of rolling members 124c (for example, balls or rollers) displaced rollably along between the bearing washers 124a and 124b. With this structure, both of the bearing washers 124a and 124b can be rotated with relative to each other as the rolling members 124c roll along between the bearing washers 124a and 124b.

The second thrust bearing 125 comprises a pair of bearing washers (a third bearing washer 125a and a fourth bearing washer 125b) disposed to oppose each other, and a plurality of rolling members 125c (for example, balls or rollers) disposed rollably along between the bearing washers 125a and 125b. With this structure, both of the bearing washers 125a and 125b can be rotated with relative to each other as the rolling members 125c roll along between the bearing washers 125a and 125b.

In this case, the second bearing washer 124b and the third bearing washer 125a located to be in contact with the stopper 123p in the state where the first and second thrust bearings 124 and 125 are arranged on both sides of the stopper 123*p*, respectively. Here, the third drive-shaft part 13*a* is inserted from the second thrust bearing 125 (the bearing washers 125*a* and 125*b*) through to the first thrust bearing 124 (the bearing washers 124*a* and 124*b*). The annular stepped section 122 of the third drive-shaft part 13*a* is brought into contact with the fourth bearing washer 125*b* of the second thrust bearing 125.

In this state, the fastening tool 126 (for example, nut) is mounted to face the first thrust bearing 124 (the bearing washers 124*a* and 124*b*). For example, the fastening tool (nut) 126 is fastened along with a thread portion (not shown) formed on the third drive-shaft part 13*a* so as to bring the tool into contact with the first bearing washer 124*a* of the first thrust bearing 124.

At this time, the first and second thrust bearings 124 and 125 on the respective sides of the stopper 123*p* are interposed between the annular stepped section 122 and the fastening tool (nut) 126. At the same time, the stopper 123*p* is interposed between the second bearing washer 124*b* and the third bearing washer 125*a*. Thus, the shaft direction supporting mechanism 120 is established, which can support the second roll 13 along the shaft directions 13*r* while maintaining the second roll 13 rotatable.

[Axial Position Adjusting Mechanism 121]

Figure 23:
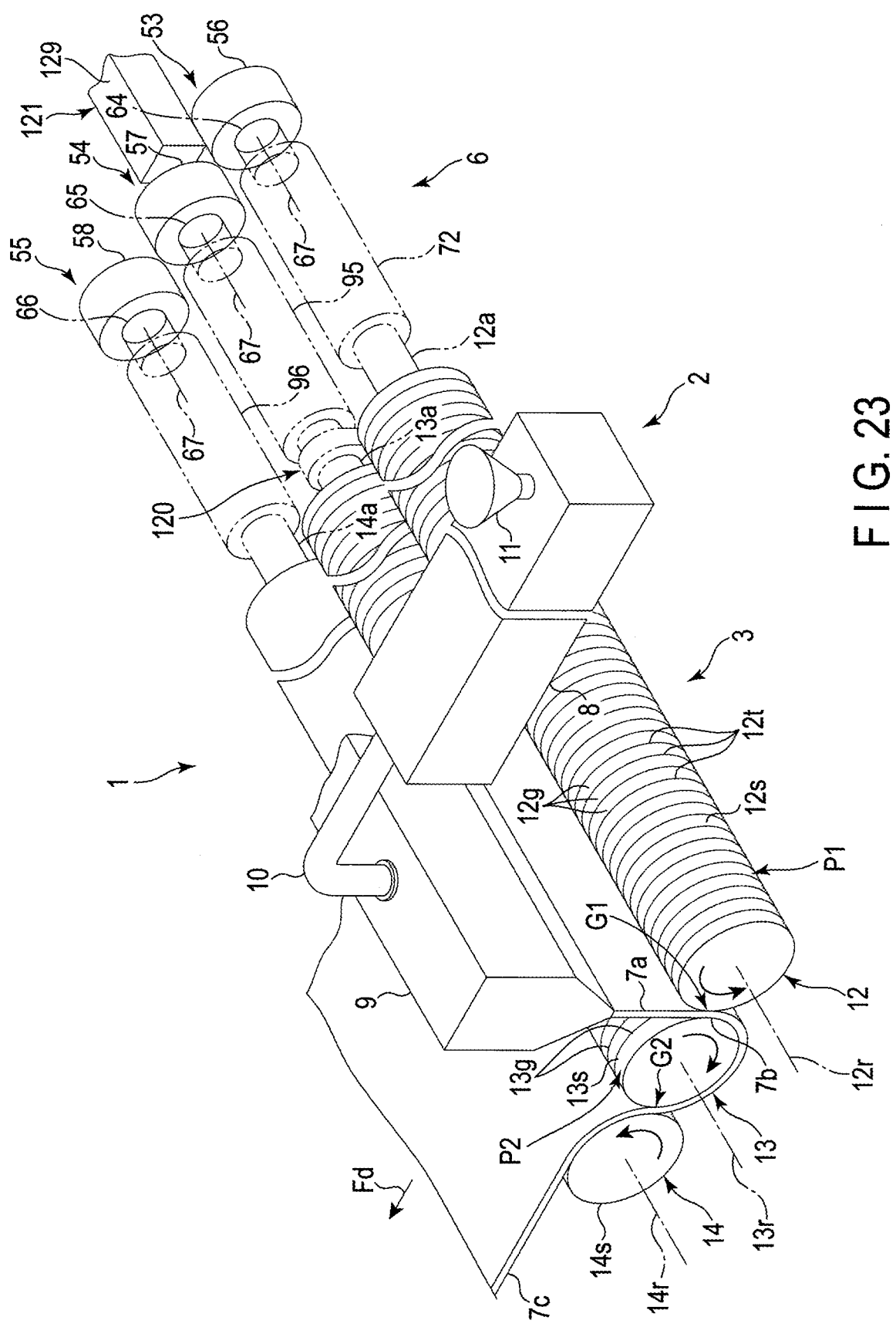
FIG. 23 is a perspective view schematically showing the basic structure of a sheet/film manufacturing apparatus according to a fifth embodiment.
Figure 24:
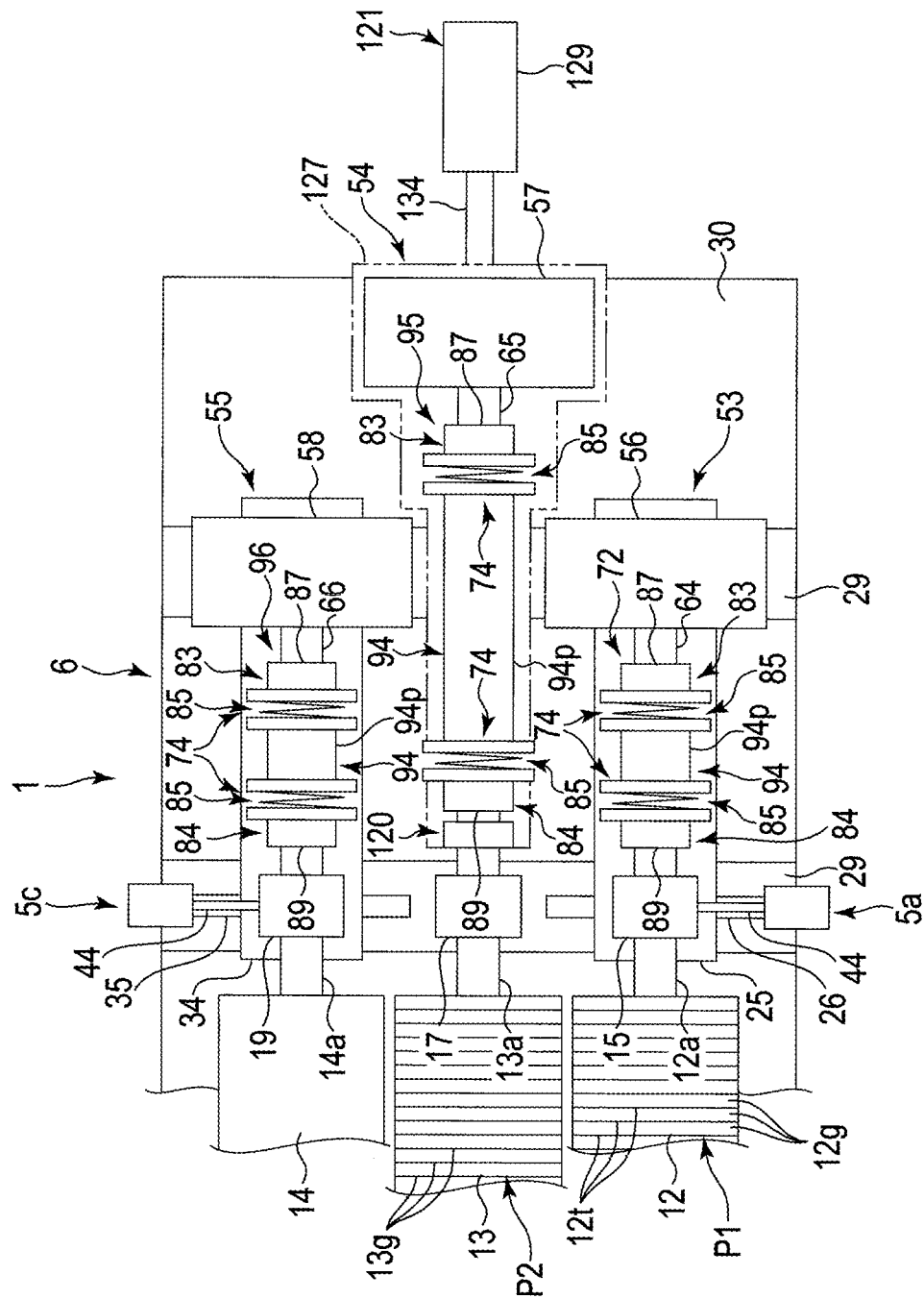
FIG. 24 is a plan view of the sheet/film manufacturing apparatus of FIG. 23.
Figure 25:
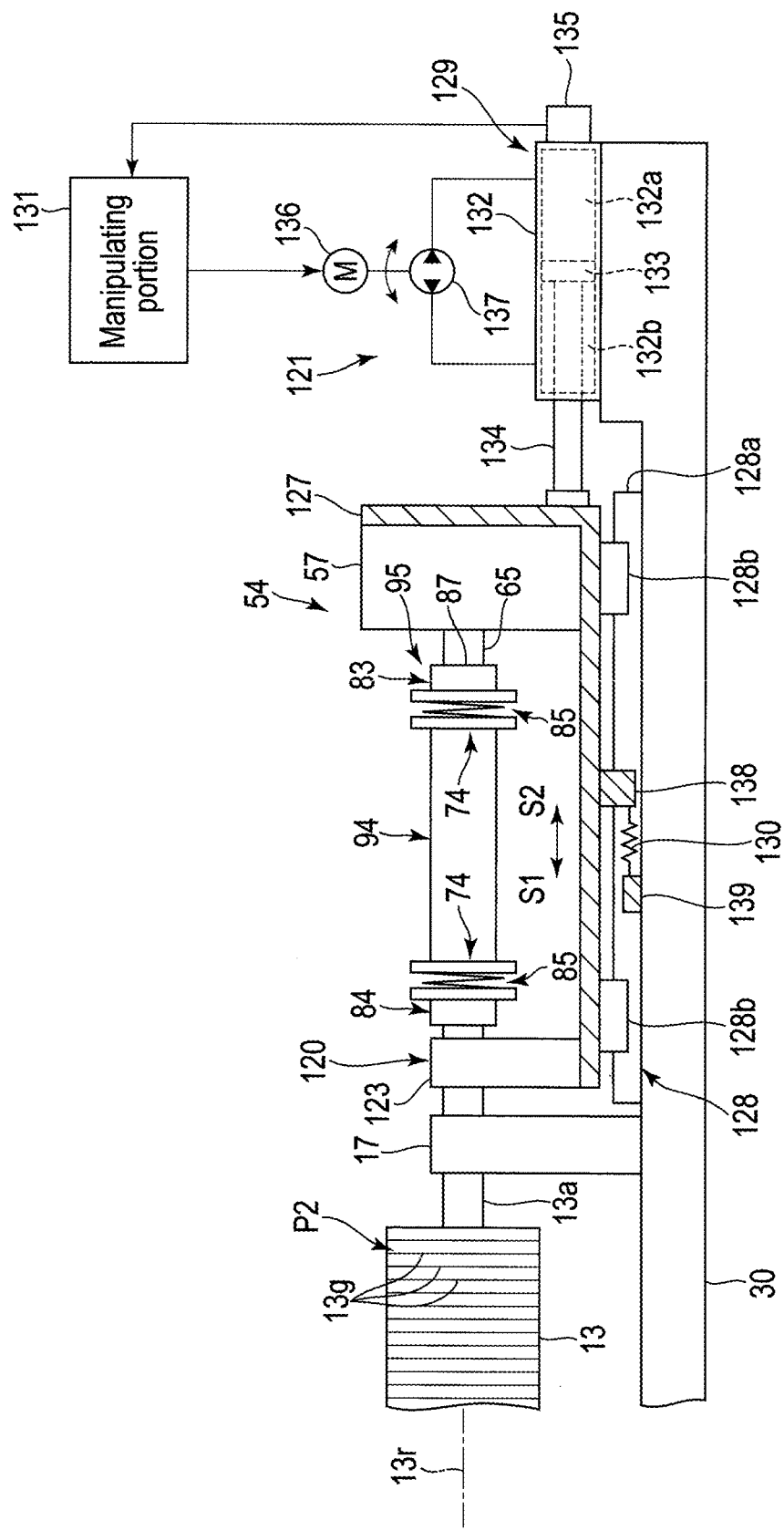
FIG. 25 is a block diagram showing the structure of a hydraulic servo type positioning mechanism.

As shown in FIG. 23 to FIG. 25, the axial position adjusting mechanism 121 comprises an adjusting plate 127, a linear guide 128, a hydraulic actuator 129 and a preload mechanism 130. On the adjusting plate 127, the second drive mechanism 54 (a second rotating shaft part 65, a second motor 57 and a second power transmission device 95) and the shaft direction supporting mechanism 120 (the bearing housing 123) are mounted integrally as one body, and the adjusting plate 127 is configured to be movable along the shaft direction 13*r*.

The linear guide 128 is formed between the base 30 and the adjusting plate 127. The linear guide 128 comprises a guide rail 128*a* disposed on the base 30 and a slider 128*b* disposed on the adjusting plate 127. The guide rail 128*a* is formed along the shaft direction 13*r*. The slider 128*b* is configured to be movable along the guide rail 128*a*. Thus, the adjusting plate 127 can be moved by the hydraulic actuator 129, which will be described later, forward as indicated by an arrow S1 and backward as indicated by an arrow S2 along the shaft direction 13*r*.

The hydraulic actuator 129 is configured to be able to apply the pressing force and traction force to the adjusting plate 127 as the operator manipulates a manipulating portion 131. The drawings shows an example in which the actuator 129 comprises a cylinder 132, a piston 133, a piston rod 134, a measuring instrument 135 that can measure the position of the piston 133, a servo motor 136 and a bidirectional pump 137.

The piston 133 is accommodated in the cylinder 132. The piston 133 is configured to be reciprocatable along the cylinder 132. The cylinder 132 includes an advancing chamber 132*a* and a retreating chamber 132*b* on respective sides of the piston 133. The piston rod 134 is formed to penetrate the cylinder 132 from the retreat chamber 132*b*. A proximal end of the piston rod 134 is connected to the piston 133. A distal end of the piston rod 134 is connected to the adjusting plate 127.

Here, as operator manipulates the manipulating portion 131, the manipulating portion 131 controls the servo motor 136 based on measurement data (for example, position information of the piston 133) from the measuring instrument 135. The servo motor 136 drives the bidirectional pump 137. At this time, the pressure to be applied on the advancing chamber 132*a* or the retreating chamber 132*b* is selectively controlled.

For example, when pressurizing the advancing chamber 132*a*, oil is supplied to the advancing chamber 132*a* from the bidirectional pump 137. Therefore, the oil pressure in the advancing chamber 132*a* rises to press the piston 133. Thus, the piston rod 134 moves forward to apply a pressing force onto the adjusting plate 127. Thereby, the adjusting plate 127 can be advanced in the direction indicated by arrow S1. At this time, the shaft direction supporting mechanism 120 (bearing housing 123) moves forward in the direction indicated by arrow S1 together with the adjusting plate 127. The third drive-shaft part 13*a* also moves in the direction S1. In this way, the second roll 13 can be moved (forwards) along the shaft direction 13*r*.

On the other hand, when pressurizing the retreating chamber 132*b*, oil is supplied to the retreating chamber 132*b* from the bidirectional pump 137. Thus, the oil pressure in the retreat chamber 132*b* rises. Therefore, the piston 133 is suctioned to retreat the piston rod 134. Thus, the traction force is applied on the adjusting plate 127. Thereby, the adjusting plate 127 can be moved backward in the direction S2. At this time, the shaft direction supporting mechanism 120 (bearing housing 123) retreats in the direction indicated by arrow S2 together with the adjusting plate 127. The third drive-shaft part 13*a* also moves in the same direction S2. In this way, the second roll 13 can be moved (backward) along the shaft direction 13*r*.

Moreover, the axial position adjusting mechanism 121 comprises the preload mechanism 130 which applies a given pressure on the hydraulic actuator 129. The preload mechanism 130 is formed between the base 30 and the adjusting plate 127. As the preload mechanism 130, for example, a spring, an air cylinder or the like can be assumed. The drawings show an example in which a spring is applied to the preload mechanism 130. One end of the spring (preload mechanism) 130 is attached to the adjusting plate 127 via an attaching portion 138, and the other end is fixed to the base 30 via a fixing portion 139.

In this case, the adjusting plate 127 is maintained in the state where the pressing force from the spring (preload mechanism) 130 is acting at all times. For example, the adjusting plate 127 is always pressurized in the direction indicated by arrow S2. This pressure acts on the piston 133 via the piston rod 134 from the adjusting plate 127. Thus, the operation of the actuator 129, that is, the reciprocation of the piston rod 134 (piston 133) can be performed at high response. In this way, movement of the adjusting plate 127, i.e., (forward or backward) movement of the second roll 13 can be carried out with high precision.

[Advantage and Effect of the Fifth Embodiment]

According to this embodiment, a cross section of the sheet (film) 7*c* (see FIG. 23) is visually observed, for example, at the initial setting of the apparatus (before the start of transcribing the patterns P1 and P2) or during the apparatus being driven (during the transcription of the patterns P1 and P2). If a displacement is observed between the patterns on the two surfaces, the operator manipulates the manipulating portion 131 without stopping the rotation of the motors 56, 57, and 58 (that is, rolls 12, 13, and 14). The manipulating portion 131 controls the servo motor 136 based on the measurement data (the position information of the piston 133) from the measuring instrument 135. Then, the oil is supplied to the advancing chamber 132*a* or the retreating chamber 132*b* from the bidirectional pump 137.

At this time, the piston rod 134 moves forward or backward together with the piston 133. The adjusting plate 127 moves forward or backward along the shaft direction 13r. Along with the adjusting plate 127, the shaft direction supporting mechanism 120 (the bearing housing 123) moves forward or backward. The third drive-shaft part 13a also moves in the same direction.

Thus, the second roll 13 can be moved (forward or backward) along the shaft direction 13r (the first roll 12). As a result, it is possible to adjust the positions of the patterns P1 and P2 on both of the first roll 12 and the second roll 13 along the shaft directions 12r and 13r, respectively. Therefore, displacement between the patterns P1 and P2 can be eliminated. In this way, a sheet (film) of a predetermined quality on which the patterns P1 and P2 are transcribed on the respective surfaces without displacement can be manufactured (formed).

According to this embodiment, the preload mechanism 130 which applies pressure on the hydraulic actuator 129 is provided. The pressing force of the preload mechanism 130 is acting on the piston 133 from the piston rod 134 at all times. Thus, the reciprocation of the piston rod 134 (the piston 133) can be performed with high response. As a result, the second roll 13 can be moved (forward or backward) with high precision. In this way, the positions of the patterns P1 and P2 along the shaft directions 12r and 13r, respectively, can be adjusted with high precision. The other advantages and effects are similar to those of the first to fourth embodiments described above, and therefore the explanations thereof will be omitted.

[Modification (1) of the Fifth Embodiment]

The fifth embodiment described above is presumed based on the specification that the patterns P1 and P2 are formed on the first and second rolls 12 and 13, respectively, but in place, such a specification that the patterns are formed on the second roll 12 and the third roll 14, respectively, can fall within the technical scope of the present invention. In this case, preset patterns are formed on a second transcription surface 13s of the second roll 13 and a feeding surface 14s of the third roll 14, respectively. A first transcription surface 12s of the first roll 12 is mirror-finished.

According to this modification, the molten resin 7a is supplied, for example, between the first roll 12 and the second roll 13 from the discharge unit 2 (T die 9). The molten resin 7b having passed through between the first roll 12 and the second rolls 13 (contact point G1 (see FIG. 1)) is conveyed along the second roll 13 and then allowed to pass the second roll 13 and the third roll 14. At this time, a sheet (film) 7c on both surfaces of which the patterns are transcribed respectively is formed.

Note that the expression "the molten resin 7b passes the second roll 13 and the third roll 14" covers a concept of both cases, namely, simultaneous pattern transcription and individual pattern transcription. The simultaneous pattern transcription is applied to the first to fifth embodiments, in which when the molten resin 7b passes through between the second roll 13 and the third roll 14, which face each other to be rotatable, patterns are simultaneously transcribed on both surfaces of the molten resin 7b, respectively.

The individual pattern transcription is carried out by a structure comprising the second roll 13 and a pressing roll (not shown) which face each other and are rotatable, and the third roll 14 and a pressing roll (not shown) which face each other and are rotatable. According to this structure, when the molten resin 7b passes through between the second roll 13 and the pressing roll, a pattern is transcribed on the surface of the molten resin 7b. Then, when the molten resin 7b passes through between the third roll 14 and the pressing roll, a pattern is transcribed on the rear surface of the molten resin 7b.

Here, displacement between the patterns on these surfaces is found while visual observation of the cross section of the sheet (film) 7c (see FIG. 23), the operator manipulate the manipulating portion 131. At this time, the second roll 13 can be moved (forward or backward) along the shaft direction 13r (third roll 14) by the actuator 129. As a result, the positions of the patterns on the second roll 13 and the third roll 14 along the shaft directions 13r and 14r, respectively, can be both adjusted. The other advantages and effects are similar to those of the first to fourth embodiments described above, and therefore the explanations thereof will be omitted.

[Modification (2) of the Fifth Embodiment]

The fifth embodiment and Modification (1) described above are presumed based on the specification that the displacement between the patterns on the surfaces are confirmed by visual observation on the cross section of the sheet (film) 7c, but in place, such a specification that the displacement between patterns on the two surfaces is confirmed by optically detecting the patterns on the two surfaces of the sheet (film) 7c, respectively, can also fall within the technical scope of the present invention.

In this case, based on the result of the optical detection of the two patterns, the manipulating portion 131 automatically controls the actuator 129. Thus, the second roll 13 can be moved (forward or backward) along the shaft direction 13r. Thus, the positions of the patterns of the second roll 13 and the third roll 14 (first roll 12) along the shaft directions 13r and 14r (12r), respectively, can be adjusted. The other structures, advantages and effects are similar to those of the fifth embodiment described above, and therefore the explanations thereof will be omitted.

[Modification (3) of the Fifth Embodiment]

The fifth embodiment and Modifications (1) and (2) described above are presumed based on the specification that the hydraulic actuator 129 is applied to the axial position adjusting mechanism 121, but in place, such a specification that an actuator of some other system is applied can also fall within the technical scope of the present invention. For example, such an apparatus that moves the adjusting plate 127 forward or backward by expanding and contracting the piezoelectric element may as well be apply.

Furthermore, as the actuator of the other system, for example, such an apparatus that moves an adjusting plate jointed with a screw, forward or backward by rotating the screw by a motor (see JP 2004-142182 A) or such an apparatus that moves an adjusting plate via a tapered block jointed with a screw, forward or backward by rotating the screw by a motor (see JP H10-34748 A, FIG. 7) may be applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A double-sided transcription type sheet/film forming roll apparatus comprising a first roll and a second roll configured to be rotatable in opposition to each other, on each of which a preset pattern is formed and configured to feed a molten resin into a part between the first roll and the second roll to thereby form a sheet or a film on both surfaces of which the patterns are transcribed, the apparatus comprising:
- a first motor configured to rotate the first roll;
- a second motor including a rotor on which a plurality of permanent magnets are arranged, an attaching surface of the rotor, and a rotating shaft attached to the rotor, the second motor being configured to rotate the second roll;
- a disk-like flange part provided at one end of the rotating shaft of the second motor and attached by bolt fastening to the attaching surface concentrically;
- a push-pull unit configured to move the first roll toward or away from the second roll;
- a power transmission mechanism configured to couple the second motor with the second roll, the power transmission mechanism comprising an intermediate bearing part and first and second shaft couplings, the first shaft coupling the rotating shaft of the second motor and the intermediate shaft part with each other, and the second shaft coupling the rotating shaft of the second roll and the intermediate shaft part with each other, wherein a variation state of the rotating shaft of the second roll created when bringing the first roll close to and away from the second roll is absorbed to be eliminated as the intermediate shaft part is inclined with respect to the first shaft coupling as a base point, thereby maintaining a posture of the rotating shaft of the second motor constant at all times;
- a shaft direction supporting mechanism configured to support the second roll along a shaft direction in a state where the second roll is rotatable; and
- an axial position adjusting mechanism configured to move the shaft direction supporting mechanism along the shaft direction,
- the second roll being configured to move in the shaft direction along the first roll with movement of the shaft direction supporting mechanism, thereby adjusting the positions of both patterns on the first roll and the second roll along the shaft direction.

2. The apparatus of claim 1, wherein the axial position adjusting mechanism further comprises, in addition to the shaft direction supporting mechanism, an adjusting plate configured to move the second motor and the power transmission device integrally along the shaft direction.

3. The apparatus of claim 2, wherein the axial position adjusting mechanism comprises a hydraulic actuator configured to move the adjusting plate forward and backward with an oil pressure.

4. The apparatus of claim 3, wherein the axial position adjusting mechanism comprises a preload mechanism configured to apply a given pressure to the hydraulic actuator.

5. The apparatus of claim 1, wherein the intermediate shaft part is an integrated single axial member or prepared from a plurality of axial members coupled with each other.

6. The apparatus of claim 1, wherein the shaft couplings are each a flexible coupling or a ball joint.

7. A double-sided transcription type sheet/film forming roll apparatus comprising a first roll and a second roll configured to be rotatable in opposition to each other, a third roll rotatable in synchronism with the second roll, on each of the second roll and the third roll, a preset pattern is formed and configured to feed a molten resin into a part between the first roll and the second roll to form a sheet or a film on both surfaces of which the patterns are transcribed, as the molten resin passes through between the second roll and the third roll, the apparatus comprising:
- a first motor configured to rotate the first roll;
- a second motor including a rotor on which a plurality of permanent magnets are arranged, an attaching surface of the rotor, and a rotating shaft attached to the rotor, the second motor being configured to rotate the second roll;
- a disk-like flange part provided at one end of the rotating shaft of the second motor and attached by bolt fastening to the attaching surface concentrically;
- a push-pull unit configured to move the first roll toward or away from the second roll;
- a power transmission mechanism configured to couple the second motor with the second roll,
- the power transmission mechanism comprising an intermediate bearing part and first and second shaft couplings, the first shaft coupling the rotating shaft of the second motor and the intermediate shaft part with each other, and the second shaft coupling the rotating shaft of the second roll and the intermediate shaft part with each other, wherein a variation state of the rotating shaft of the second roll created when bringing the first roll close to and away from the second roll is absorbed to be eliminated as the intermediate shaft part is inclined with respect to the first shaft coupling as a base point, thereby maintaining a posture of the rotating shaft of the second motor constant at all times;
- a shaft direction supporting mechanism configured to support the second roll along a shaft direction in a state where the second roll is rotatable; and
- an axial position adjusting mechanism configured to move the shaft direction supporting mechanism along the shaft direction,
- the second roll being configured to move in the shaft direction along the third roll with movement of the shaft direction supporting mechanism, thereby adjusting the positions of both patterns on the second roll and the third roll along the shaft direction.

8. The apparatus of claim 7, wherein the axial position adjusting mechanism further comprises, in addition to the shaft direction supporting mechanism, an adjusting plate configured to move the second motor and the power transmission device integrally along the shaft direction.

9. The apparatus of claim 7, wherein the intermediate shaft part is an integrated single axial member or prepared from a plurality of axial members coupled with each other.

10. The apparatus of claim 7, wherein the shaft couplings are each a flexible coupling or a ball joint.

* * * * *